(12) United States Patent
Huang et al.

(10) Patent No.: US 11,877,324 B2
(45) Date of Patent: Jan. 16, 2024

(54) METHOD AND APPARATUS FOR HANDLING CONTENTION RESOLUTION FOR A RANDOM ACCESS PROCEDURE IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/706,678

(22) Filed: Mar. 29, 2022

(65) Prior Publication Data

US 2022/0322458 A1 Oct. 6, 2022

Related U.S. Application Data

(60) Provisional application No. 63/169,668, filed on Apr. 1, 2021, provisional application No. 63/280,339, filed on Nov. 17, 2021.

(51) Int. Cl.
*H04L 12/413* (2006.01)
*H04W 74/08* (2009.01)
(Continued)

(52) U.S. Cl.
CPC .......... *H04W 74/0841* (2013.01); *H04L 1/08* (2013.01); *H04L 12/413* (2013.01);
(Continued)

(58) Field of Classification Search
CPC ............ H04B 7/18513; H04B 7/18523; H04B 7/18578; H04L 12/4035; H04L 12/413;
(Continued)

(56) References Cited

U.S. PATENT DOCUMENTS

| | | | |
|---|---|---|---|
| 2021/0160915 A1* | 5/2021 | Xu | H04W 72/53 |
| 2021/0289460 A1* | 9/2021 | Medles | H04W 76/27 |

(Continued)

FOREIGN PATENT DOCUMENTS

| | | |
|---|---|---|
| CN | 111836397 A | 10/2020 |
| WO | 2019031797 A1 | 2/2019 |
| WO | 2020071698 A1 | 4/2020 |

OTHER PUBLICATIONS

O. Kodheli et al., "Random Access Procedure Over Non-Terrestrial Networks: From Theory to Practice," in IEEE Access, vol. 9, pp. 109130-109143, 2021, doi: 10.1109/ACCESS.2021.3101291. (Year: 2021).*

(Continued)

*Primary Examiner* — Salvador E Rivas
(74) *Attorney, Agent, or Firm* — Skaar Ulbrich Macari, P.A.

(57) ABSTRACT

Methods and apparatuses for a User Equipment (UE) to monitor the Physical Downlink Control Channel (PDCCH) appropriately in order to reduce power consumption and perform Contention Resolution for a Random Access (RA) procedure in a Non-Terrestrial Network (NTN). The UE can perform a Msg3 transmission during a RA procedure in a NTN and start a RA contention resolution timer in the first symbol after the end of the Msg3 transmission plus a timing offset. In response to expiry of the RA contention resolution timer, the UE determines whether to consider Contention Resolution not successful based on at least whether the RA contention resolution timer expires during a time duration of the timing offset after a Msg3 retransmission.

20 Claims, 15 Drawing Sheets

(51) Int. Cl.
    *H04L 1/08*       (2006.01)
    *H04W 72/0446*    (2023.01)
    *H04W 72/23*      (2023.01)
    *H04W 74/00*      (2009.01)
    *H04W 84/06*      (2009.01)
    *H04W 28/02*      (2009.01)
    *H04W 56/00*      (2009.01)
    *H04L 12/403*     (2006.01)

(52) U.S. Cl.
    CPC ....... *H04W 72/0446* (2013.01); *H04W 72/23* (2023.01); *H04W 74/00* (2013.01); *H04W 74/08* (2013.01); *H04W 74/0866* (2013.01); *H04L 12/4035* (2013.01); *H04W 28/0236* (2013.01); *H04W 56/004* (2013.01); *H04W 56/0055* (2013.01); *H04W 84/06* (2013.01)

(58) Field of Classification Search
    CPC . H04W 74/04; H04W 74/08; H04W 28/0236; H04W 56/004; H04W 56/0055; H04W 74/00; H04W 74/0833
    See application file for complete search history.

(56) References Cited

U.S. PATENT DOCUMENTS

| | | | |
|---|---|---|---|
| 2022/0006514 A1* | 1/2022 | Sedin | H04L 1/1883 |
| 2022/0007455 A1* | 1/2022 | Hong | H04W 76/28 |
| 2022/0095258 A1* | 3/2022 | Yeo | H04W 80/02 |
| 2022/0201770 A1* | 6/2022 | Xu | H04W 74/0841 |
| 2022/0322459 A1* | 10/2022 | Zhou | H04W 74/0866 |
| 2022/0330187 A1* | 10/2022 | Cheng | H04W 56/004 |
| 2023/0156823 A1* | 5/2023 | Xu | H04W 76/27 |
| | | | 370/329 |

OTHER PUBLICATIONS

3GPP, "TS38.331 v.16.3.0", Dec. 2020, pp. 1-156 (Year: 2020).*
R1-2005265, "Discussion on timing relationship enhancements for NTN", Aug. 17-28, 2020, pp. 1-6 (Year: 2020).*
Asia Pacific Telecom et al.: "Timing relationship enhancements to NB-IoT in NTN", 3GPP Draft; R1-2100977, retrieved from the Internet on Jan. 19, 2021; URL:https://ftp.3gpp.org/tsg_ran/WG1_RL1/TSGR1_104-e/Docs/R1-2100977.zip; 11 pages.
Extended European Search Report to the corresponding European Patent Application rendered by the European Patent Office dated Jul. 22, 2022, 9 pages.

* cited by examiner

METHOD AND APPARATUS FOR HANDLING CONTENTION RESOLUTION FOR A RANDOM ACCESS PROCEDURE IN A WIRELESS COMMUNICATION SYSTEM

CROSS-REFERENCE TO RELATED APPLICATIONS

The present application claims priority to and the benefit of U.S. Provisional Patent Application Ser. No. 63/169,668, filed Apr. 1, 2021, and U.S. Provisional Patent Application Ser. No. 63/280,339, filed Nov. 17, 2021; with the full disclosure of each referenced application fully incorporated herein by reference.

FIELD

This disclosure generally relates to wireless communication networks and, more particularly, to a method and apparatus for handling Contention Resolution in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for a User Equipment (UE) are provided to monitor the Physical Downlink Control Channel (PDCCH) appropriately in order to reduce power consumption and perform Contention Resolution for a Random Access (RA) procedure in a Non-Terrestrial Network (NTN). The UE can perform a Msg3 transmission and start a RA contention resolution timer, receive an Uplink (UL) grant for Msg3 retransmission on PDCCH when the timer is running, and perform a Msg3 retransmission using the UL grant. The UE can stop the timer in response to receiving the UL grant and start the timer in the first symbol after the end of the Msg3 retransmission plus a timing offset if the Msg3 transmission is in a NTN, and the UE can restart the timer in the first symbol after the end of the Msg3 retransmission if the Msg3 transmission is in a Terrestrial Network (TN).

In various embodiments, a UE initiates a RA procedure, transmits a Msg3 in the RA procedure, starts a first timer with a first value at a first timing, and receives an UL grant for Msg3 retransmission on the PDCCH when the first timer is running. The UE retransmits the Msg3 using the UL grant and restarts the first timer with a second value at a second timing.

In various embodiments, a UE performs a Msg3 transmission and starts a RA contention resolution timer, receives an UL grant for Msg3 retransmission on PDCCH when the RA contention resolution timer is running, and performs a Msg3 retransmission using the UL grant. The UE further stops the RA contention resolution timer in response to receiving the UL grant and starts the RA contention resolution timer in the first symbol after the end of the Msg3 retransmission plus a timing offset if the Msg3 transmission is in a NTN, and restarts the RA contention resolution timer in the first symbol after the end of the Msg3 retransmission if the Msg3 transmission is in a TN.

In various embodiments, a UE performs a Msg3 transmission during a RA procedure in a NTN and starts a RA contention resolution timer in the first symbol after the end of the Msg3 transmission plus a timing offset. In response to expiry of the RA contention resolution timer, the UE determines whether to consider Contention Resolution not successful based on at least whether the RA contention resolution timer expires during a time duration of the timing offset after a Msg3 retransmission.

In various embodiments, a UE performs a Msg3 transmission during a RA procedure in a NTN, and starts a RA contention resolution timer in a first symbol after the end of the Msg3 transmission plus a timing offset, wherein if the RA contention resolution timer expires during a time duration of the timing offset after a Msg3 retransmission, not considering Contention Resolution not successful.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-201256, "Solutions for NR to support non-terrestrial networks (NTN)"; [2] 3GPP TS 38.321 V16.3.0, "NR, MAC protocol specification"; and [3] 3GPP TR 38.821 V16.0.0, "Solutions for NR to support non-terrestrial networks (NTN)"; [4] 3GPP TS 38.331 V16.3.1, "NR, RRC protocol specification". The standards and documents listed above are hereby expressly and fully incorporated herein by reference in their entirety.

Figure 1:
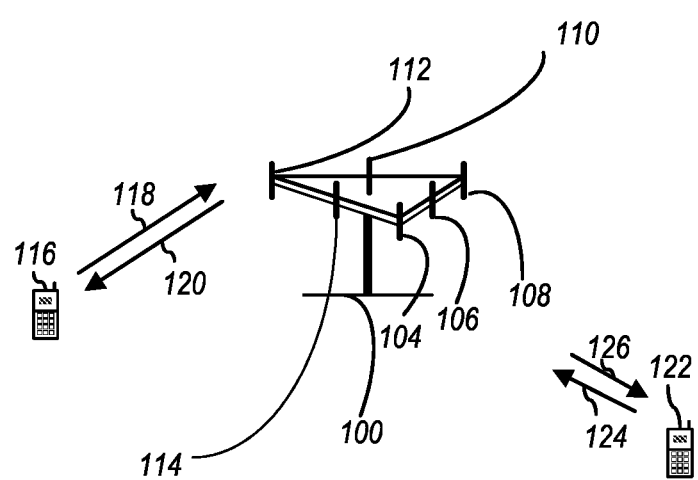
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
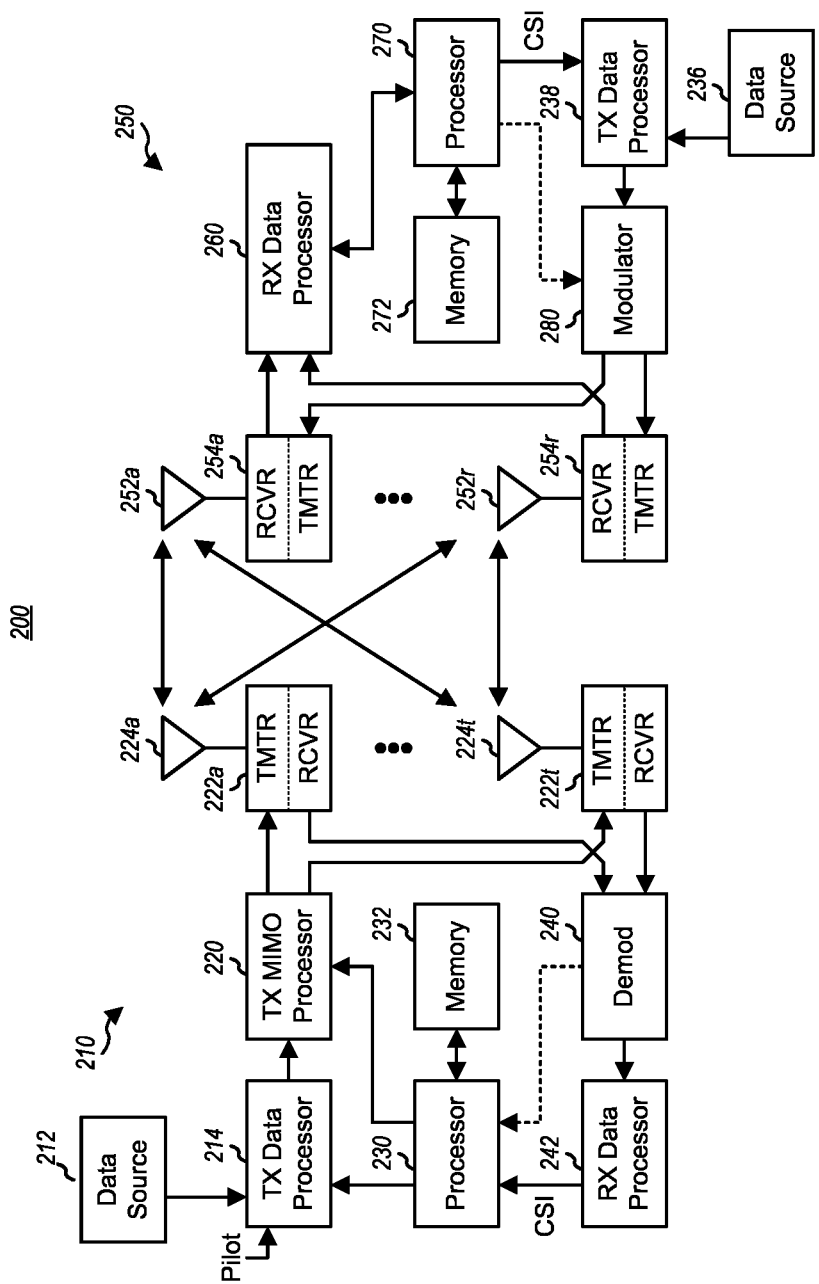
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
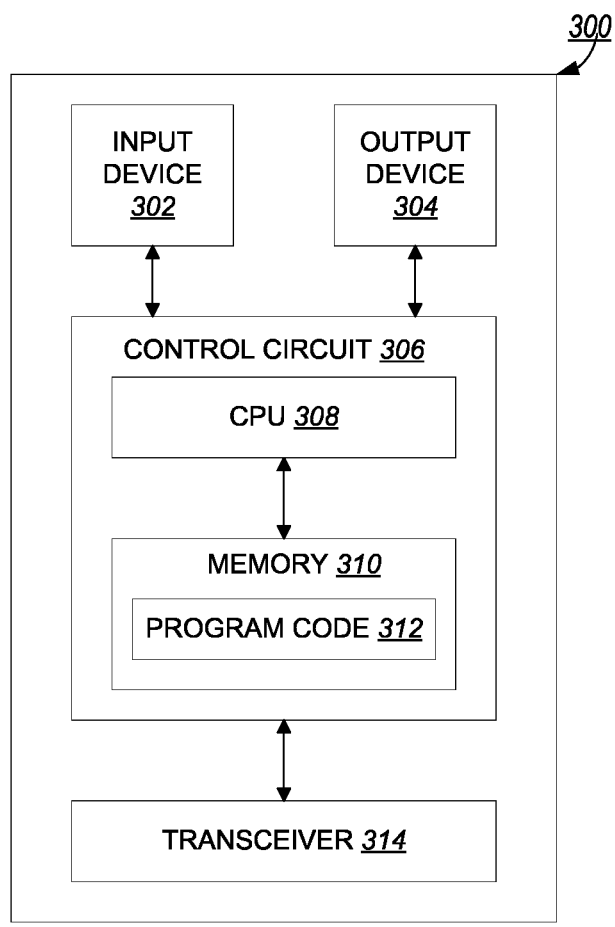
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
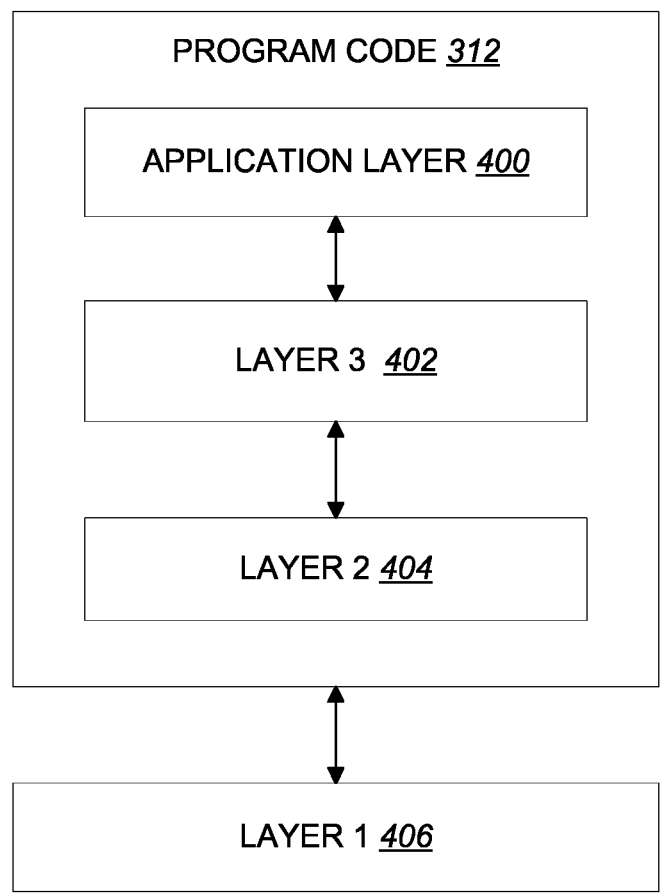
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

The work item of non-terrestrial networks (NTN) in NR has been approved in RAN plenary #88 meeting. The description of the work item is specified in [1] RP-201256, "Solutions for NR to support non-terrestrial networks (NTN)":

Quotation Start[1]

3 Justification

Non-terrestrial networks refer to networks, or segments of networks, using an airborne or spaceborne vehicle for transmission:
  Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)
  Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.
In 3GPP TS 22.261 approved at SA #82, use cases for 5G Satellite integration and the corresponding service requirements have been identified as result of the work item "5GSAT". This will address mobile broadband needs in unserved/underserved areas as well as public safety needs, maritime (3GPP TS 22.119 "Maritime communication services over 3GPP system"), airplane connectivity and railway communication service requirements applicable to satellite access.
Since RAN #76, two activities on NR to support Non-Terrestrial Networks have been successively carried out
  A first activity, FS_NR_nonterr_nw (see RP-171450) studied the channel model for the non-terrestrial networks, to define deployment scenarios, parameters and identify the key potential impacts on NR. The work led by RAN started at RAN #76 and has been completed at RAN #80. The results are reflected in TR 38.811.
  A second activity, FS_NR_NTN_solutions (see RP-190710), define and evaluate solutions for the identified key impacts from the first activity. The work led by RAN3 started at RAN #80 and is planned to be completed at RAN #86. The results are reflected in TR 38.821 (RP-193062).
Furthermore an email discussion took place between RAN #85 and #86 on the scoping of a Rel-17 WI on non-terrestrial network. The report of this email discussion is available in RP-192500. It concluded that the Rel-17 NR-NTN NWI should include two activities:
  Normative activity on NR-NTN to develop specifications to support the following scenarios:
    Transparent payload based LEO scenario addressing at least 3GPP class 3 UE with and without GNSS capability and both Earth fixed &/or moving cell scenario (as per SI outcome).
      Note 1: Addressing LEO will provide the flexibility to also support transparent payload based HAPS based scenarios.
    Transparent payload based GEO scenario addressing UE with GNSS capability.
      Note 2: Addressing LEO and GEO scenarios will enable NR to support all NGSO scenarios with circular orbit at altitude greater than or equal to 600 km.
  Study activity on NTN scenarios addressing
    Transparent payload based HAPS scenarios: Study of enablers for Spectrum coexistence with cellular (additional Coresets, PCI confusion mitigation, . . . )
    IoT-NTN based scenarios
    NTN-network based location of UE (for regulatory services): identify possible solutions
Based on the above points, a new work item is proposed to carry the conclusion of the FS_NR_NTN_solutions study item and specify the solutions enabling NR to support non-terrestrial networks.
Addressing LEO and GEO scenarios will enable to support all NGSO scenarios with circular orbit at altitude greater than or equal to 600 km.

4 Objective 4.1 Objective of SI or Core Part WI or Testing Part WI

The work item aims to specify the enhancements identified for NR NTN (non-terrestrial networks) especially LEO and GEO with implicit compatibility to support HAPS (high altitude platform station) and ATG (air to ground) scenarios according to the following principles:
  FDD is assumed for core specification work for NR-NTN.
    NOTE: This does not imply that TDD cannot be used for relevant scenarios e.g. HAPS, ATG
  Earth fixed Tracking area is assumed with Earth fixed and moving cells
  UEs with GNSS capabilities are assumed.
  Transparent payload is assumed
  The detailed objectives are to specify enhancing features to Rel-15 & Rel-16's NR radio interface & NG-RAN as follows:

4.1.1 RAN1

Enhancing features to address the identified issues due to long propagation delays, large Doppler effects, and moving cells in NTN, the following should be specified (see TR 38.821):
  Timing relationship enhancements [RAN1,RAN2]
  Enhancements on UL time and frequency synchronization [RAN1,RAN2]
  HARQ
    Number of HARQ process [RAN1]
    Enabling/disabling of HARQ feedback as described in the TR 38.821 [RAN1&2]
  In addition, the following topics should be specified if beneficial and needed
    Enhancement on the PRACH sequence and/or format and extension of the ra-ResponseWindow duration (in the case of UE with GNSS capability but without pre-compensation of timing and frequency offset capabilities) [RAN1/2].
    Feeder link switch [RAN2,RAN1]
    Beam management and Bandwidth Parts (BWP) operation for NTN with frequency reuse [RAN1/2]
    Including signalling of polarization mode 4.1.2 RAN2

NOTE: offset based solutions for timer adaptations are assumed.
The following user plane procedures enhancements should be specified (see TR 38.821)

MAC
  Random access:
    Definition of an offset for the start of the ra-ResponseWindow for NTN.
      Introduction of an offset for the start of the ra-ContentionResolutionTimer to resolve Random access contention
      Solutions for resolving preamble ambiguity and extension of RAR window.
      Adaptation for Msg-3 scheduling
        Only for the case with pre-compensation of timing and frequency offset at UE side)
    Enhancement on UL scheduling to reduce scheduling latency.
  DRX:
    If HARQ feedback is enabled, introduction of offset for drx-HARQ-RTT-TimerDL and drx-HARQ-RTT-TimerUL.
    If HARQ is turned off per HARQ process, adaptions in HARQ procedure
  Scheduling Request: Extension of the value range of sr-ProhibitTimer
RLC
  Status reporting: Extension of the value range of t-Reassembly
  Sequence Numbers: extension of the SN space only for GEO scenarios
PDCP
  SDU discard: Extension of the value range of discardTimer.
  Sequence Numbers: extension of the SN space for GEO scenarios.
The following control plane procedures enhancements should be specified (see TR 38.821)
  Idle mode:
    Definition of additional assistance information for cell selection/reselection (e.g. using UE location information, satellite Ephemeris information)
    Definition of NTN (satellite/HAPS) cell specific information in SIB
  Connected mode
    Enhancement necessary to take into account location information (UE & Satellite/HAPS) and/or ephemeris in determining when to perform hand-over, in order to have a high degree of hand-over control for hand-over robustness and coverage management.
    Enhancement to existing measurement configurations to address absolute propagation delay difference between satellites (e.g. SMTC measurement gap adaptation to the SSB/CSI-RS measurement window) [RAN2/4].
  Service continuity for mobility from TN to NTN and from NTN to TN systems (to be addressed when connected mode mobility has sufficiently progressed)
  Identify potential issues associated to the use of the existing Location Services (LCS) application protocols to locate UE in the context of NTN and specify adaptations if any [RAN2/3]

Quotation End

The procedure of random access (RA) contention resolution and completion is specified in TS 38.321 [2] (3GPP TS 38.321 V16.3.0, "NR, MAC protocol specification") as below:

Quotation Start [2]

5.1.5 Contention Resolution

Once Msg3 is transmitted the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
  2> if the C-RNTI MAC CE was included in Msg3:
    3> if the Random Access procedure was initiated for SpCell beam failure recovery (as specified in clause 5.17) and the PDCCH transmission is addressed to the C-RNTI; or
    3> if the Random Access procedure was initiated by a PDCCH order and the PDCCH transmission is addressed to the C-RNTI; or
    3> if the Random Access procedure was initiated by the MAC sublayer itself or by the RRC sublayer and the PDCCH transmission is addressed to the C-RNTI and contains a UL grant for a new transmission:
      4> consider this Contention Resolution successful;
      4> stop ra-ContentionResolutionTimer;
      4> discard the TEMPORARY_C-RNTI;
      4> consider this Random Access procedure successfully completed.
  2> else if the CCCH SDU was included in Msg3 and the PDCCH transmission is addressed to its TEMPORARY_C-RNTI:
    3> if the MAC PDU is successfully decoded:
      4> stop ra-ContentionResolutionTimer;
      4> if the MAC PDU contains a UE Contention Resolution Identity MAC CE; and
      4> if the UE Contention Resolution Identity in the MAC CE matches the CCCH SDU transmitted in Msg3:
        5> consider this Contention Resolution successful and finish the disassembly and demultiplexing of the MAC PDU;
        5> if this Random Access procedure was initiated for SI request:
          6> indicate the reception of an acknowledgement for SI request to upper layers.
        5> else:
          6> set the C-RNTI to the value of the TEMPORARY_C-RNTI;
        5> discard the TEMPORARY_C-RNTI;
        5> consider this Random Access procedure successfully completed.
      4> else:
        5> discard the TEMPORARY_C-RNTI;
        5> consider this Contention Resolution not successful and discard the successfully decoded MAC PDU.
1> if ra-ContentionResolutionTimer expires:
  2> discard the TEMPORARY_C-RNTI;
  2> consider the Contention Resolution not successful.

1> if the Contention Resolution is considered not successful:
  2> flush the HARQ buffer used for transmission of the MAC PDU in the Msg3 buffer;
  2> increment PREAMBLE_TRANSMISSION_COUNTER by 1;
  2> if PREAMBLE_TRANSMISSION_COUNTER= preambleTransMax+1:
    3> indicate a Random Access problem to upper layers.
    3> if this Random Access procedure was triggered for SI request:
      4> consider the Random Access procedure unsuccessfully completed.
  2> if the Random Access procedure is not completed:
    3> if the RA_TYPE is set to 4-stepRA:
      4> select a random backoff time according to a uniform distribution between 0 and the PREAMBLE_BACKOFF;
      4> if the criteria (as defined in clause 5.1.2) to select contention-free Random Access Resources is met during the backoff time:
        5> perform the Random Access Resource selection procedure (see clause 5.1.2);
      4> else:
        5> perform the Random Access Resource selection procedure (see clause 5.1.2) after the backoff time.
    3> else (i.e. the RA_TYPE is set to 2-stepRA):
      4> if msgA-TransMax is applied (see clause 5.1.1a) and PREAMBLE_TRANSMISSION_COUNTER=msgA-TransMax+1:
        5> set the RA_TYPE to 4-stepRA;
        5> perform initialization of variables specific to Random Access type as specified in clause 5.1.1a;
        5> flush HARQ buffer used for the transmission of MAC PDU in the MSGA buffer;
        5> discard explicitly signalled contention-free 2-step RA type Random Access Resources, if any;
        5> perform the Random Access Resource selection as specified in clause 5.1.2.
      4> else:
        5> select a random backoff time according to a uniform distribution between 0 and the PREAMBLE_BACKOFF;
        5> if the criteria (as defined in clause 5.1.2a) to select contention-free Random Access Resources is met during the backoff time:
          6> perform the Random Access Resource selection procedure for 2-step RA type as specified in clause 5.1.2a.
        5> else:
          6> perform the Random Access Resource selection for 2-step RA type procedure (see clause 5.1.2a) after the backoff time 5.1.6 Completion of the Random Access Procedure Upon completion of the Random Access procedure, the MAC entity shall:
1> discard any explicitly signalled contention-free Random Access Resources for 2-step RA type and 4-step RA type except the 4-step RA type contention-free Random Access Resources for beam failure recovery request, if any;
1> flush the HARQ buffer used for transmission of the MAC PDU in the Msg3 buffer and the MSGA buffer.

Upon successful completion of the Random Access procedure initiated for DAPS handover, the target MAC entity shall:
1> indicate the successful completion of the Random Access procedure to the upper layers.

Quotation End

The DRX operation is specified in TS 38.321 [2] (3GPP TS 38.321 V16.3.0, "NR, MAC protocol specification") as below:

Quotation Start [2]

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:
  drx-onDurationTimer: the duration at the beginning of a DRX cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity;
  ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
  drx-onDurationTimer or drx-Inactivity Timer configured for the DRX group is running; or
  drx-RetransmissionTimerDL or drx-RetransmissionTimerUL is running on any Serving Cell in the DRX group; or
  ra-ContentionResolutionTimer (as described in clause 5.1.5) or msgB-Response Window (as described in clause 5.1.4a) is running; or
  a Scheduling Request is sent on PUCCH and is pending (as described in clause 5.4.4); or
  a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first transmission (within a bundle) of the corresponding PUSCH transmission;
  2> stop the drx-RetransmissionTimerUL for the corresponding HARQ process at the first transmission (within a bundle) of the corresponding PUSCH transmission.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN×10)+subframe number] modulo (drx-ShortCycle)=(drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN×10)+subframe number] modulo (drx-LongCycle)=drx-Start Offset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.
1> if a DRX group is in Active Time:
   2> monitor the PDCCH on the Serving Cells in this DRX group as specified in TS 38.213 [6];
   2> if the PDCCH indicates a DL transmission:
      3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
      3> stop the drx-RetransmissionTimerDL for the corresponding HARQ process.
      3> if the PDSCH-to-HARQ_feedback timing indicate a non-numerical k1 value as specified in TS 38.213 [6]:
         4> start the drx-RetransmissionTimerDL in the first symbol after the PDSCH transmission for the corresponding HARQ process.
   2> if the PDCCH indicates a UL transmission:
      3> start the drx-HARQ-RTT-TimerUL for the corresponding HARQ process in the first symbol after the end of the first transmission (within a bundle) of the corresponding PUSCH transmission;
      3> stop the drx-RetransmissionTimerUL for the corresponding HARQ process.
   2> if the PDCCH indicates a new transmission (DL or UL) on a Serving Cell in this DRX group:
      3> start or restart drx-InactivityTimer for this DRX group in the first symbol after the end of the PDCCH reception.
   2> if a HARQ process receives downlink feedback information and acknowledgement is indicated:
      3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
   2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS defined in TS 38.214 [7];
      3> not report semi-persistent CSI configured on PUSCH;
      3> if ps-TransmitPeriodicL1-RSRP is not configured with value true:
         4> not report periodic CSI that is L1-RSRP on PUCCH.
      3> if ps-TransmitOtherPeriodicCSI is not configured with value true:
         4> not report periodic CSI that is not L1-RSRP on PUCCH.
1> else:
   2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS defined in TS 38.214 [7] in this DRX group;
      3> not report CSI on PUCCH and semi-persistent CSI configured on PUSCH in this DRX group.
   2> if CSI masking (csi-Mask) is setup by upper layers:
      3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
         4> not report CSI on PUCCH in this DRX group.
NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

Quotation End

In the current NR MAC specification, e.g., 3GPP TS 38.321 V16.3.0, "NR, MAC protocol specification", the User Equipment (UE) can perform a Random Access (RA) procedure using 4-step and/or 2-step RA. In a 4-step RA procedure, the UE sends a RA preamble (Msg1) and receives a RAR (Msg2) from the Network (NW). In response to receiving the Msg2, the UE uses the UL grant in the Msg2 to send a Msg3 and starts a contention resolution timer (e.g., ra-ContentionResolutionTimer) in the first symbol after the end of the Msg3 transmission. In response to receiving the Msg3, the NW sends a Msg4 to inform the UE to complete the RA procedure. If the NW fails to receive the Msg3 after sending the Msg2, the NW sends a dynamic grant (DG) to the UE for retransmission. The dynamic UL grant for Msg3 retransmission is addressed to Temporary Cell Radio Network Temporary Identifier (C-RNTI) of the UE on Physical Downlink Control Channel (PDCCH). In response to receiving the DG, the UE resends the Msg3 and restarts the contention resolution timer (e.g., ra-ContentionResolutionTimer) in the first symbol after the end of the Msg3 retransmission.

In a 2-step RA procedure, the UE sends a MSGA including a RA preamble and a Physical Uplink Shared Channel (PUSCH) payload. In response to receiving the MSGA, the NW sends a MSGB to inform the UE to complete the RA procedure. If the NW receives the RA preamble but fails to receive the PUSCH payload in the MSGA, the NW sends a MSGB (e.g., with fallbackRAR) to inform the UE to fall back to Msg3. The UE uses the Uplink (UL) grant in the MSGB (e.g., with fallbackRAR) to transmit a Msg3 and starts a contention resolution timer (e.g., ra-ContentionResolutionTimer) in the first symbol after the end of the Msg3 transmission. In response to receiving the Msg3, the NW sends a Msg4 to inform the UE to complete the RA procedure. If the NW fails to receive the Msg3 after sending the MSGB (e.g., with fallbackRAR), the NW sends a DG to the UE for retransmission. In response to receiving the DG, the UE resends the Msg3 and restarts the contention resolution timer (e.g., ra-ContentionResolutionTimer) in the first symbol after the end of the Msg3 retransmission.

The UE monitors the PDCCH when the contention resolution timer (e.g., ra-ContentionResolutionTimer) is running to resolve a possible RA contention. The contention resolution timer (e.g., ra-ContentionResolutionTimer) is used to receive a Msg4 and/or DG after a Msg3 transmission/retransmission. The contention resolution timer (e.g., ra-ContentionResolutionTimer) is used for Contention Resolution in a RA procedure. The contention resolution timer (e.g., ra-ContentionResolutionTimer) is configured by the NW in a RA configuration (e.g., RACH-ConfigCommon, RACH-ConfigCommonTwoStepRA), e.g., 3GPP TS 38.331 V16.3.1, "NR, RRC protocol specification"). And the initial value (e.g., the length) of the contention resolution timer (e.g., ra-ContentionResolutionTimer) could be configured as 8, 16, 24, 32, 40, 48, 56, and/or 64 subframes. When the UE receives a Msg4, the UE stops the contention resolution timer (e.g., ra-ContentionResolutionTimer) and considers the RA procedure successfully completed. When the UE receive a DG for Msg3 retransmission (e.g., UL grant addressed to Temporary C-RNTI of the UE and/or while the contention resolution timer is running), the UE restarts the contention resolution timer (e.g., ra-ContentionResolutionTimer) and retransmits the Msg3.

The above handling on the contention resolution timer (e.g., ra-ContentionResolutionTimer) may be applicable in general (e.g., in a Terrestrial Network (TN) cell). On the other hand, the Non-terrestrial Networks (NTNs) were introduced in New Radio (NR) to use an airborne/spaceborne vehicle as platform for providing mobile services, e.g., RP-201256, "Solutions for NR to support non-terrestrial networks (NTN)". The UE may link to, camp on, and/or connect to the NTN network that involves airborne/spaceborne for transmission. NTN comprises various platforms, including low earth orbiting (LEO) satellites, medium earth orbiting (MEO) satellites, highly elliptical orbiting (HEO) satellites, geostationary earth orbiting (GEO) satellites, non-geostationary orbiting (NGSO) satellites and/or high altitude platform stations (HAPS). More details regarding different NTN platforms could be found in 3GPP TR 38.821 V16.0.0, "Solutions for NR to support non-terrestrial networks (NTN)". The NTN could offer a wide-area coverage and provide NW access in the scenario when terrestrial networks (TN) are unfeasible (e.g., desert, polar area, and/or on an airplane).

However, for the long distance from UE to the platform(s), the transmission between the UE and the NW in NTN needs a longer round trip time (RTT) than the transmission between the UE and the NW in TN. That is, there is round trip delay (RTD) between the UE and the NW in NTN. The UE may need more time to receive a Msg4 and/or DG for retransmission after a Msg3 transmission/retransmission. Also, the UE may unnecessarily monitor the PDCCH during the RTT, which results in power consumption. Based on the Work Item (WI) description (e.g., RP-201256, "Solutions for NR to support non-terrestrial networks (NTN)" and TR 38.821), a timing offset for the start of the contention resolution timer (e.g., ra-ContentionResolutionTimer) may be introduced in NTN. When the UE is in and/or connected to a NTN cell, the UE may apply and/or use the timing offset. The timing offset may be the time delay between the UE and the NW in NTN.

Figure 5:
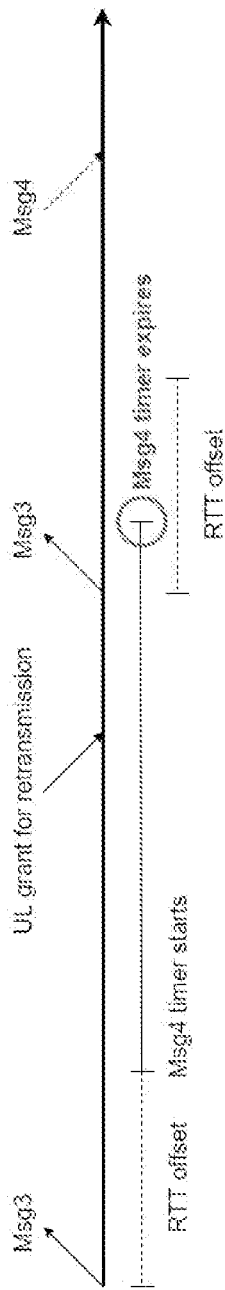
FIG. 5 shows an example of the issue when the Msg4 timer restarts with a timing offset, wherein the Msg4 timer may be a contention resolution timer in a RA procedure, and wherein the RTT offset refers to the timing offset, in accordance with embodiments of the present invention.

As shown in FIG. 5, the UE may transmit a Msg3 using UL grant received in Msg2 and/or MSGB (e.g., with fallbackRAR). In some case (e.g., in a NTN cell), the UE may start a contention resolution timer (e.g., ra-ContentionResolutionTimer) after the timing offset after the Msg3 transmission (e.g., in the end of the Msg3 transmission+the timing offset). When the contention resolution timer (e.g., ra-ContentionResolutionTimer) is running, the UE may monitor the PDCCH addressed to a Temporary C-RNTI. If the UE receives a DG for Msg3 retransmission (e.g., UL grant addressed to Temporary C-RNTI of the UE), the UE may retransmit the Msg3 using the DG. In some case (e.g., in a NTN cell), the UE may restart the contention resolution timer (e.g., ra-ContentionResolutionTimer) after the timing offset after the Msg3 retransmission (e.g. in the end of the Msg3 retransmission+the timing offset). However, it may be possible that the contention resolution timer (e.g., ra-ContentionResolutionTimer) expires during the timing offset after the retransmission of the Msg3 (e.g., after Msg3 retransmission but before the contention resolution timer is restarted). The contention resolution timer (e.g., ra-ContentionResolutionTimer) may expire before it is restarted. Once the contention resolution timer (e.g., ra-ContentionResolutionTimer) expires, the UE may consider the Contention Resolution as not successful. The UE may proceed to retransmit another Msg1 after the Contention Resolution is considered not successful.

To avoid the problem, the UE may apply the timing offset for the start of the contention resolution timer (e.g., ra-ContentionResolutionTimer) after the Msg3 transmission and not apply the timing offset for the restart of the contention resolution timer (e.g., ra-ContentionResolutionTimer) after the Msg3 retransmission. The UE may start the contention resolution timer (e.g., ra-ContentionResolutionTimer) after the timing offset after the Msg3 transmission (e.g., in the end of the Msg3 transmission+the timing offset). And the UE may restart the contention resolution timer (e.g., ra-ContentionResolutionTimer) after the Msg3 retransmission (e.g., in the end of the Msg3 transmission).

Figure 6:
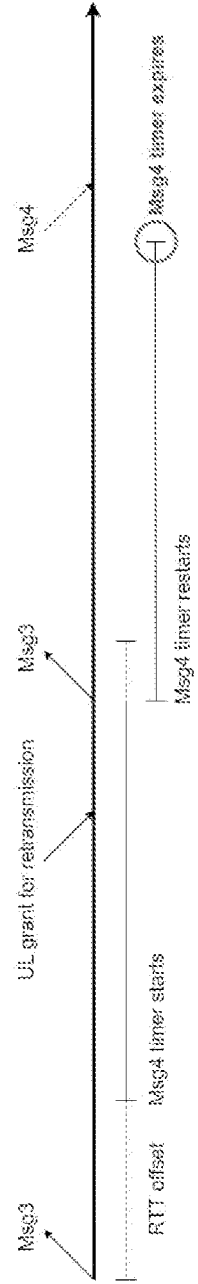
FIG. 6 shows an example of the issue when the Msg4 timer restarts without a timing offset, wherein the Msg4 timer may be a contention resolution timer in a RA procedure, and wherein the RTT offset refers to the timing offset, in accordance with embodiments of the present invention.

As shown in FIG. 6, considering the large RTD in NTN, the length of contention resolution timer (e.g., ra-ContentionResolutionTimer) without timing offset may not be long enough to receive the NW response (e.g., Msg4) for some NTN platforms (e.g., GEO). In NTN, the maximum RTD is 541.46 ms for GEO and 25.77 ms for LEO, e.g., 3GPP TR 38.821 V16.0.0, "Solutions for NR to support non-terrestrial networks (NTN)". And in the current NR Radio Resource Control (RRC) specification, e.g., 3GPP TS 38.331 V16.3.1, "NR, RRC protocol specification", the maximum length of the contention resolution timer (e.g., ra-ContentionResolutionTimer) is 64 subframes (i.e., 64 ms), which is much shorter than 541.46 ms. Moreover, even if the length of the contention resolution timer (e.g., ra-ContentionResolutionTimer) could be sufficient to cover the large RTT to receive the NW response (e.g., Msg4, DG) in NTN, since the UE can only receive the NW response after the RTT, the actual time duration left for the NW to schedule a response (e.g., Msg4, DG) to the UE during the contention resolution timer is reduced. The contention resolution timer (e.g., ra-ContentionResolutionTimer) without timing offset may limit the scheduling flexibility for a NW.

To solve one or more of the above issues, the UE could apply different values/lengths to a first timer for the case when the UE starts the first timer and when the UE restarts the first timer. The UE could start the first timer with a first value/length and restart the first timer with a second value/length. The second value/length may be different from the first value/length (e.g., larger/longer than the first value/length). The second value/length may be the first value/length plus a timing offset. The first value/length and the second value/length may be received in the same configuration from the NW. The first value/length and the second value/length may be received in different configurations from the NW. The configuration(s) may be a RA configuration and/or a NTN configuration. The first timer may be a contention resolution timer (e.g., ra-ContentionResolutionTimer). The first timer may be a timer used for Contention Resolution in a RA procedure. The first timer with the first value/length may be started after a Msg3 transmission (e.g., in the end of the Msg3 transmission+the timing offset). The first timer with the first value/length may be started in the symbol n+x. The symbol n is the first symbol after the end of the Msg3 transmission. The x is the length of the timing offset. The first timer with the second value/length may be restarted after a Msg3 retransmission (e.g., in the end of the Msg3 retransmission). The first timer with the second value/length may be restarted in the first symbol after the end of the Msg3 retransmission. The first timer with the first value/length and the first timer with the second value/length may be configured in the same configuration. The first timer with the first value/length and the first timer with the second value/length may be configured in different configurations. The configuration(s) may be a RA configuration and/or a NTN configuration. The first timer with the first value/length and the first timer with the second value/length may be the same timer with different values in the configuration(s). The first timer with the first value/length and the first timer with the second value/length may be two different timers in the configuration(s).

Figure 7:
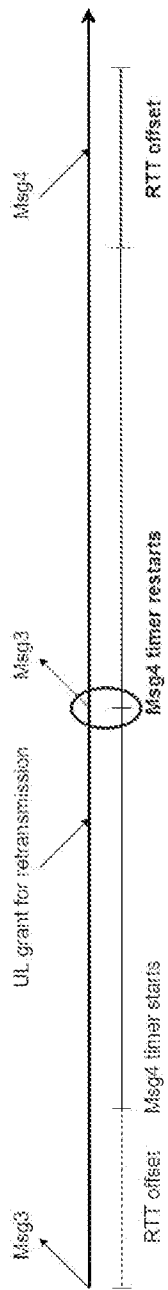
FIG. 7 shows an example of a first solution, wherein the Msg4 timer may be a contention resolution timer in a RA procedure, and wherein the RTT offset refers to the timing offset, in accordance with embodiments of the present invention.

For example, as shown in FIG. 7, the UE may transmit a Msg3 using UL grant received in Msg2 and/or MSGB (e.g., with fallbackRAR). The UE may start a first timer after a timing offset after the Msg3 transmission (e.g., in the end of the Msg3 transmission+the timing offset). When the first timer is running, the UE may monitor the PDCCH addressed to a Temporary C-RNTI (and possibly receive a DG for retransmission). The UE may retransmit the Msg3 using the DG. The UE may restart the first timer, of which the length is extended by the timing offset, after the end of the Msg3 retransmission (in the end of the Msg3 retransmission). When the first timer is running, the UE may monitor the PDCCH addressed to a Temporary C-RNTI (and possibly receive a Msg4). The UE may consider the RA procedure successfully completed after receiving the Msg4.

To solve one or more of the above issues, the UE could restart a first timer after a Msg3 retransmission (e.g., in the end of the Msg3 retransmission). Additionally, or alternately, the UE could restart the first timer when the first timer expires after a Msg3 retransmission. Additionally, or alternately, the UE could restart the first timer after a timing offset after the Msg3 retransmission (e.g., in the end of the Msg3 retransmission+the timing offset). The first timer may be a contention resolution timer (e.g., ra-ContentionResolutionTimer). The first timer may be a timer used for Contention Resolution in a RA procedure. The first timer may be started after a Msg3 transmission (e.g., in the end of the Msg3 transmission+the timing offset). The first timer may be started in the symbol n+x. The symbol n is the first symbol after the end of the Msg3 transmission. The x is the length of the timing offset. The first timer may be restarted after a Msg3 retransmission (e.g., in the end of the Msg3 retransmission). The first timer may not be restarted after a Msg3 retransmission (e.g., in the end of the Msg3 retransmission). The first timer may be restarted when/upon/after/in response to the first timer expires based on whether at least a condition is fulfilled or not. The first timer may be restarted when/upon/after/in response to the first timer expires, if an UL grant has been received for Msg3 retransmission. The first timer may be restarted when/upon/after/in response to the first timer expires, if the Msg3 has been retransmitted. The first timer may be restarted when/upon/after/in response to the first timer expires during a time duration within a timing offset after the Msg3 retransmission. The first timer may be restarted after a timing offset after the Msg3 retransmission (e.g., in the end of the Msg3 retransmission+the timing offset). The first timer may be restarted in the first symbol after the end of the Msg3 retransmission. The first timer may be restarted in the symbol m+x. The symbol m is the first symbol after the end of the Msg3 retransmission. The x is the length of the timing offset. The first timer may not be restarted after the timing offset after the Msg3 retransmission (e.g., in the end of the Msg3 retransmission+the timing offset). The first timer may be configured in a RA configuration and/or NTN configuration.

Figure 8:
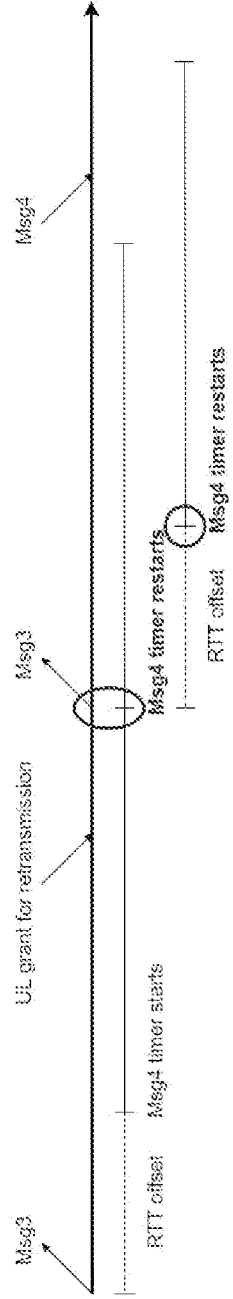
FIG. 8 shows an example of a second solution, wherein the Msg4 timer may be a contention resolution timer in a RA procedure, and wherein the RTT offset refers to the timing offset, in accordance with embodiments of the present invention.

For example, as shown in FIG. 8, the UE may transmit a Msg3 using UL grant received in Msg2 and/or MSGB (e.g., with fallbackRAR). The UE may start a first timer after a timing offset after the Msg3 transmission (e.g., in the end of the Msg3 transmission+the timing offset). When the first timer is running, the UE may monitor the PDCCH addressed to a Temporary C-RNTI (and possibly receive a DG for retransmission). The UE may retransmit the Msg3 using the DG. The UE may restart the first timer after the Msg3 retransmission (e.g., in the end of the Msg3 retransmission). The UE may restart the first timer after a timing offset after the Msg3 retransmission (e.g., in the end of the Msg3 retransmission+the timing offset). When the first timer is running, the UE may monitor the PDCCH addressed to a Temporary C-RNTI (and possibly receive a Msg4). The UE may consider the RA procedure successfully completed after receiving the Msg4.

For example, the UE may transmit a Msg3 using UL grant received in Msg2 and/or MSGB (e.g., with fallbackRAR). The UE may start a first timer after a timing offset after the Msg3 transmission (e.g., in the end of the Msg3 transmission+the timing offset). When the first timer is running, the UE may monitor the PDCCH addressed to a Temporary C-RNTI (and possibly receive a DG for retransmission). The UE may retransmit the Msg3 using the DG. The UE may restart the first timer when (or in response to) the first timer expires during a timing offset after the Msg3 retransmission. The UE may restart the first timer after the timing offset after the Msg3 retransmission (e.g., in the end of the Msg3 retransmission+the timing offset). When the first timer is running, the UE may monitor the PDCCH addressed to a Temporary C-RNTI (and possibly receive a Msg4). The UE may consider the RA procedure successfully completed after receiving the Msg4.

The UE may monitor the PDCCH after a Msg3 is transmitted. The UE may monitor the PDCCH after a timing offset after a Msg3 transmission (e.g., the end of the Msg3 transmission+the timing offset) until receiving a Msg4. The UE may monitor the PDCCH until the Contention Resolution is considered successful. The UE may monitor the PDCCH until the Contention Resolution is considered not successful. The UE may monitor the PDCCH during a specific period after the retransmission of Msg3.

Figure 9:
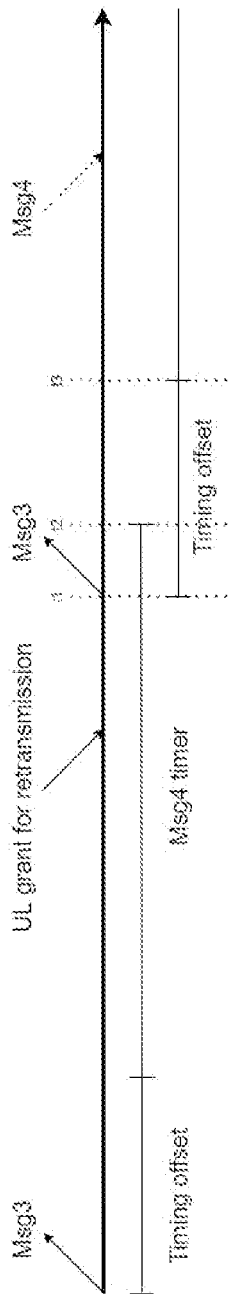
FIG. 9 shows an example of PDCCH monitoring for Msg3 transmission, wherein the Msg4 timer (e.g., the first timer) may be a contention resolution timer in a RA procedure, in accordance with embodiments of the present invention.

For example, as shown in FIG. 9, the UE may transmit a Msg3 using an UL grant received in Msg2 and/or MSGB (e.g., with fallbackRAR). In response to the Msg3 transmission, the UE may receive a dynamic UL grant for Msg3 retransmission. The UE may retransmit the Msg3 using the dynamic UL grant. The UE may receive a Msg4 in response to the Msg3 retransmission.

In the above case, the UE may monitor the PDCCH during a first period. The UE may not monitor the PDCCH during the first period. The first period may start after the Msg3 retransmission (e.g., in the end of the Msg3 retransmission), for example, the time point t1 in FIG. 9. The first period may end after the timing offset after the Msg3 retransmission (e.g., in the end of the Msg3 retransmission+the timing offset), for example, the time point t3 in FIG. 9.

Also in the above case, the UE may monitor the PDCCH during a second period. The UE may not monitor the PDCCH during the second period. The second period may start after the Msg3 retransmission (e.g., in the end of the Msg3 retransmission), for example, the time point t1 in FIG. 9. The second period may end after the first timer expires (e.g., in the end of the Msg3 transmission+the timing offset+the length of the first timer), for example, the time point t2 in FIG. 9.

Also in the above case, the UE may monitor the PDCCH during a third period. The UE may not monitor the PDCCH during the third period. The third period may start after the first timer expires (e.g., in the end of the Msg3 transmission+the timing offset+the length of the first timer), for example, the time point t2 in FIG. 9. The third period may end after the timing offset after the Msg3 retransmission (e.g., in the end of the Msg3 retransmission+the timing offset), for example, the time point t3 in FIG. 9.

The restarting mechanism (e.g., what is mentioned above) could prevent the contention resolution timer (e.g., ra-ContentionResolutionTimer) from unexpectedly expiring; however, the UE may need to monitor the PDCCH all the time. Considering that the UE is not likely to receive the NW response (e.g., Msg4, DG) during timing offset after the Msg3 transmission and/or retransmission, it may not be necessary to monitor the PDCCH all the time. To reduce power consumption, some further solutions may be considered.

To solve one or more of the above issues, the UE could stop a first timer when (or in response to) receiving an UL grant for Msg3 retransmission. Alternatively, or additionally, the UE could stop the first timer at/after/upon (or in response to) a Msg3 retransmission. The UL grant may be a dynamic grant addressed to a Temporary C-RNTI. The UL grant may be received by the UE from the NW when the first timer is running. The first timer may be a contention resolution timer (e.g., ra-ContentionResolutionTimer). The first timer may be a timer used for Contention Resolution in a RA procedure. The first timer may be started after a Msg3 transmission and/or retransmission (e.g., in the end of the Msg3 transmission and/or retransmission+the timing offset). The first timer may be started in the symbol n+x. The symbol n is the first symbol after the end of the Msg3 transmission and/or retransmission. The x is the length of the timing offset. The first timer may be started in the first symbol after the end of the Msg3 transmission and/or retransmission plus the timing offset. The first timer may be started after (or in response to) a UL grant for Msg3 retransmission is received. The first timer may be started in the symbol m+x. The symbol m is the first symbol after the end of the UL grant for Msg3 retransmission is received and/or the first symbol after the end of the Msg3 retransmission. The x is the length of the timing offset. When the first timer is stopped, the UE may not consider the Contention Resolution as not successful. When the first timer is stopped, the UE may continue the RA procedure. When the first timer is expired, the UE may consider the Contention Resolution as not successful. The first timer may be configured in a RA configuration and/or NTN configuration.

Handling of the first timer when (or in response to) receiving the UL grant for Msg3 retransmission and/or after (or in response to) performing a Msg3 retransmission may be different when the UE is in TN and NTN. When (or in response to) receiving the UL grant for Msg3 retransmission, the UE could determine whether to stop the first timer (e.g., based on whether the UE is in TN or NTN, and/or whether a Msg3 (re)transmission is performed in TN or NTN). When (or in response to) receiving the UL grant for Msg3 retransmission, the UE may determine to stop the first timer if a Msg3 transmission and/or retransmission is in a NTN (or if the UE is in a NTN). Then the UE may start the first timer after the Msg3 retransmission plus the timing offset (e.g., in the end of Msg3 retransmission plus the timing offset). When (or in response to) receiving the UL grant for Msg3 retransmission, the UE could determine to start the first timer after a Msg3 retransmission plus the timing offset (e.g., in the end of Msg3 retransmission plus the timing offset) if the Msg3 transmission and/or retransmission is in a NTN (or if the UE is in a NTN). When (or in response to) receiving the UL grant for Msg3 retransmission, the UE may determine not to stop the first timer if a Msg3 transmission and/or retransmission is not in a NTN (or if the UE is not in a NTN). When (or in response to) receiving the UL grant for Msg3 retransmission, the UE may determine not to stop the first timer if a Msg3 transmission and/or retransmission is in a TN (or if the UE is in a TN). When (or in response to) receiving the UL grant for Msg3 retransmission, the UE may determine to restart the first timer if a Msg3 transmission and/or retransmission is not in a NTN (or if the UE is not in a NTN). When (or in response to) receiving the UL grant for Msg3 retransmission, the UE may determine to restart the first timer if a Msg3 transmission and/or retransmission is in a TN (or if the UE is in a TN). After (or in response to) performing a Msg3 retransmission, the UE could determine to start the first timer after the Msg3 retransmission plus the timing offset (e.g., in the end of Msg3 retransmission plus the timing offset) if the Msg3 transmission and/or retransmission is in a NTN (or if the UE is in a NTN). After (or in response to) performing a Msg3 retransmission, the UE could determine to restart the first timer if a Msg3 transmission and/or retransmission is not in a NTN (or if the UE is not in a NTN). After (or in response to) performing a Msg3 retransmission, the UE could determine to restart the first timer if a Msg3 transmission and/or retransmission is in a TN (or if the UE is in a TN).

Figure 10:
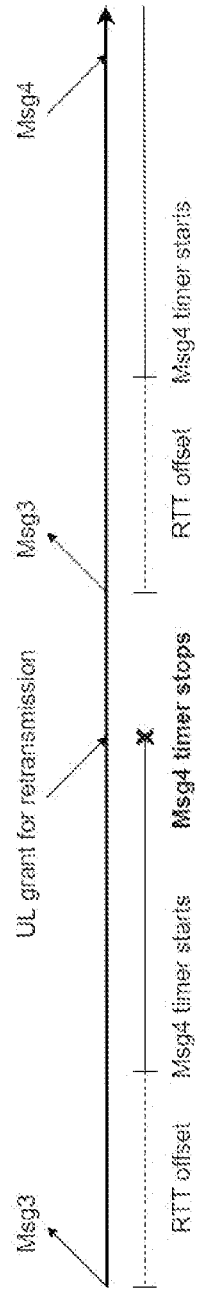
FIG. 10 shows an example of a third solution, wherein the Msg4 timer may be a contention resolution timer in a RA procedure, and wherein the RTT offset refers to the timing offset, in accordance with embodiments of the present invention.

For example, as shown in FIG. 10, the UE may transmit a Msg3 using UL grant received in Msg2 (e.g., Random Access Response, RAR) and/or MSGB (e.g., with fallbackRAR) in a NTN. The UE in the NTN may be in and/or connected to a NTN cell. The UE may start a first timer after the timing offset after the Msg3 transmission (e.g., in the end of the Msg3 transmission+the timing offset). When the first timer is running, the UE may monitor the PDCCH addressed to a Temporary C-RNTI (and possibly receive a DG for retransmission). The UE may stop the first timer when (or in response to) receiving the DG for retransmission (e.g., based on the Msg3 is transmitted in the NTN). The UE may retransmit the Msg3 using the DG. The UE may start the first timer after the timing offset after the Msg3 retransmission (e.g., in the end of the Msg3 retransmission+the timing offset) (e.g., based on the Msg3 is transmitted in the NTN). When the first timer is running, the UE may monitor the PDCCH addressed to a Temporary C-RNTI (and possibly receive a Msg4). The UE may consider the RA procedure successfully completed and/or stop the first timer after receiving the Msg4. The UE may consider Contention Resolution (e.g., of the RA procedure) not successful if the first timer expires.

For example, the UE may transmit a Msg3 using UL grant received in Msg2 (e.g., Random Access Response (RAR)) and/or MSGB (e.g., with fallbackRAR) in a TN. The UE in the TN may be in and/or connected to a TN cell. The UE may start a first timer after the Msg3 transmission (e.g., in the end of the Msg3 transmission). When the first timer is running, the UE may monitor the PDCCH addressed to a Temporary C-RNTI (and possibly receive a DG for retransmission). The UE may retransmit the Msg3 using the DG. The UE may restart the first timer after the Msg3 retransmission (e.g., in the end of the Msg3 retransmission) (e.g., based on the Msg3 is transmitted in the TN). When the first timer is running, the UE may monitor the PDCCH addressed to a Temporary C-RNTI (and possibly receive a Msg4). The UE may consider the RA procedure successfully completed and/or stop the first timer after receiving the Msg4. The UE may consider Contention Resolution (e.g., of the RA procedure) not successful if the first timer expires.

According to various embodiments of the present invention, when a Msg3 transmission and/or retransmission is performed in NTN, the UE may be in and/or connected to a NTN cell. When the UE transmits and/or retransmits a Msg3 in NTN, the UE may be in and/or connected to a NTN cell. When a Msg3 transmission and/or retransmission is performed in TN, the UE may be in and/or connected to a TN cell. When the UE transmits and/or retransmits a Msg3 in TN, the UE may be in and/or connected to a TN cell.

According to various embodiments of the present invention, the UL grant may be a dynamic grant and/or a dynamic UL grant (e.g., addressed to a Temporary C-RNTI). The dynamic UL grant may be replaced by and/or referred to dynamic grant.

According to various embodiments of the present invention, the timing offset may be a period/duration of time delay (e.g., RTT, RTD) between the UE and the NW in NTN. According to various embodiments of the present invention, the "timing offset after the end of the Msg3 transmission" may be a period/duration after the end of the Msg3 transmission. According to various embodiments of the present invention, the "timing offset after the end of the Msg3 retransmission" may be a period/duration after the end of the Msg3 retransmission.

According to various embodiments of the present invention, there may be a second timer used as timing offset. The second timer may be configured by the NW in a RA and/or NTN configuration. The length/value of the second timer may be the timing offset. The length/value of the second timer may be x symbols. The second timer may be started after (or in response to) a Msg3 transmission and/or retransmission. The second timer may be started in the first symbol after the end of the Msg3 transmission and/or retransmission. The second timer may be started after (or in response to) a UL grant reception. The second timer may be started in the first symbol after the end of the UL grant reception. According to various embodiments of the present invention, the "timing offset after the end of the Msg3 transmission" may be the time the second timer expires after a Msg3 transmission. According to various embodiments of the present invention, the "timing offset after the end of the Msg3 retransmission" may be the time the second timer expires after a Msg3 retransmission. The first timer may be started and/or restarted when the second timer expires.

According to various embodiments of the present invention, the timing offset may be the RTT, RTD, and/or (twice the) propagation delay between the UE and the NW (e.g., gNB). The timing offset may comprise the feeder link delay, UE-gNB delay, and/or UE-platform delay. The UE may receive and/or be configured with the timing offset from/by the NW. The UE may calculate a UE specific value as the timing offset. The UE may receive and/or be configured with a UE specific and/or common value from/by the NW, and use the value(s) to calculate the timing offset. The timing offset may be a common value (e.g., broadcast by the NW). The timing offset may be a UE specific value (e.g., K_offset) . The timing offset may be a common value (e.g., received from NW) plus a UE specific value (e.g., calculated by the UE). The timing offset may be a TA value calculated by the UE. The timing offset may be a TA value received from the NW. The timing offset may be estimated by the Msg1/MSGA transmission. The timing offset may be the TA received in a Msg2/MSGB (i.e., used for Msg3 transmission) plus a common value. The value of the timing offset may be based on the GNSS/position of the UE. The timing offset may be common to the UEs in the same serving cell/beam. The timing offset may be a delay value corresponding to a common reference point (e.g., the cell center), experienced by all UEs served within the cell/beam. The timing offset may be specific to the UE. The timing offset may be a delay value corresponding to the total delay between the UE and the reference point (e.g., the cell center) and/or NW (e.g., gNB), where this value is specific to each UE within the cell/beam.

In some cases (e.g., contention resolution timer is restarted after the timing offset after Msg3 retransmission), the contention resolution timer (e.g., ra-ContentionResolutionTimer) may expire during the timing offset after the retransmission of a Msg3 (e.g., after Msg3 retransmission but before the Msg3 retransmission+the timing offset). Once the contention resolution timer (e.g., ra-ContentionResolutionTimer) expires, the UE may consider the Contention Resolution as not successful. It may be assumed that the UE may apply the timing offset for the (re)start of the contention resolution timer (e.g., ra-ContentionResolutionTimer) when the contention resolution timer (e.g., ra-ContentionResolutionTimer) is started and/or restarted. Then other modifications may be considered.

To solve one or more of the above issues, when a first timer expires, the UE could determine whether to consider the Contention Resolution not successful based on at least whether a condition is fulfilled or not. For example, the condition may be if the first timer is expired during a time duration within a timing offset after a Msg3 transmission and/or retransmission. For example, the condition may be if an UL grant for Msg3 retransmission (e.g., a dynamic UL grant addressed to Temporary C-RNTI on the PDCCH) is not received when the first timer is running (and/or after the last time the first timer is started/restarted). For example, the condition may be if the PDCCH is not indicating/scheduling a Msg3 retransmission when the first timer is running (and/or after the last time the first timer is started/restarted). For example, the condition may be if a Msg3 has not been retransmitted when the first timer is running (and/or after the last time the first timer is started/restarted). For example, the condition may be if the first timer would not be started/restarted later (e.g., after a timing offset after a Msg3 transmission/retransmission). For example, the condition may be if the first timer is not to be started/restarted after a timing offset (e.g., the first timer expiry+a timing offset).

In various embodiments, when a first timer expires, the UE considers the Contention Resolution not successful if the first timer is expired (and/or expires) not during the timing offset after a Msg3 transmission and/or retransmission. Alternatively, or additionally, when a first timer expires, the UE does not consider the Contention Resolution not successful if the first timer is expired (and/or expires) during the timing offset after a Msg3 transmission and/or retransmission.

In various embodiments, when a first timer expires, the UE considers the Contention Resolution not successful if an UL grant for retransmitting a Msg3 is not received when the first timer is running (and/or after the last time the first timer is started/restarted). Alternatively, or additionally, when a first timer expires, the UE does not consider the Contention Resolution not successful if an UL grant for retransmitting a Msg3 is received when the first timer is running (and/or after the last time the first timer is started/restarted).

In various embodiments, when a first timer expires, the UE considers the Contention Resolution not successful if the PDCCH does not indicate/schedule a Msg3 retransmission when the first timer is running (and/or after the last time the first timer is started/restarted). Alternatively, or additionally, when a first timer expires, the UE does not consider the Contention Resolution not successful if the PDCCH indicate/schedule a Msg3 retransmission when the first timer is running (and/or after the last time the first timer is started/restarted).

In various embodiments, when a first timer expires, the UE considers the Contention Resolution not successful if a Msg3 has not been retransmitted when the first timer is running (and/or after the last time the first timer is started/restarted). Alternatively, or additionally, when a first timer expires, the UE does not consider the Contention Resolution not successful if a Msg3 has been retransmitted when the first timer is running (and/or after the last time the first timer is started/restarted).

In various embodiments, when a first timer expires, the UE considers the Contention Resolution not successful if the first timer would not be (re)started later (e.g., due to a Msg3 retransmission). Alternatively, or additionally, when a first timer expires, the UE does not consider the Contention Resolution not successful if the first timer would be (re)started later (e.g., due to a Msg3 retransmission).

When a first timer expires, the UE may consider the Contention Resolution not successful if the first timer is not to be (re)started after a timing offset (e.g., the first timer expiry+a timing offset). After a timing offset after a first timer expires (e.g., the first timer expiry+a timing offset), the UE may consider the Contention Resolution not successful. When a first timer expires, the UE may consider the Contention Resolution not successful delayed by a timing offset. Alternatively, or additionally, when a first timer expires, the UE may not consider the Contention Resolution not successful if the first timer (re)started during a timing offset after the first timer expiry.

In another example, when a first timer expires, the UE considers the RA procedure is unsuccessfully completed if the first timer is expired not during the timing offset after a Msg3 transmission and/or retransmission. When a first timer expires, the UE does not consider the RA procedure is unsuccessfully completed if the first timer is expired during the timing offset after a Msg3 transmission and/or retransmission.

The first timer may be a contention resolution timer (e.g., ra-ContentionResolutionTimer). The first timer may be a timer used for Contention Resolution in a RA procedure. The first timer may be started after a Msg3 transmission and/or retransmission (e.g., in the end of the Msg3 transmission/retransmission+the timing offset). The first timer may be started in the symbol n+x. The symbol n is the first symbol after the end of the Msg3 transmission and/or retransmission. The x is the length of the timing offset. The timing offset after a Msg3 transmission and/or retransmission may be the time when the second timer is running. The first timer and/or second timer may be configured in a RA configuration and/or NTN configuration.

Figure 11:
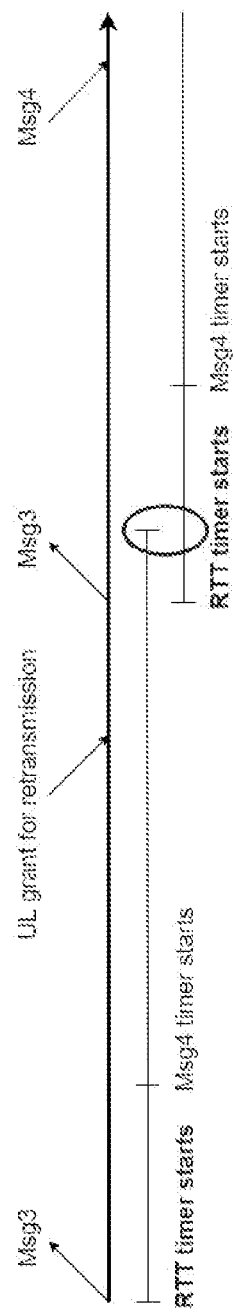
FIG. 11 shows an example of a fourth solution, wherein the Msg4 timer may be a contention resolution timer in a RA procedure, wherein the RTT timer refers to the timing offset, in accordance with embodiments of the present invention.

For example, as shown in FIG. 11, the UE may transmit a Msg3 using UL grant received in Msg2 and/or MSGB (e.g., with fallbackRAR). The UE may start a second timer after the Msg3 transmission (e.g., in the end of the Msg3 transmission). The UE may start the first timer after (or in response to) the second timer expires. When the first timer is running, the UE may monitor the PDCCH addressed to a Temporary C-RNTI (and possibly receive a DG for retransmission). The UE may retransmit the Msg3 using the DG. The UE may start the second timer after the Msg3 retransmission (e.g., in the end of the Msg3 retransmission). When the first timer expires, the UE checks whether the second timer is running. If the second timer is running, the UE may not consider the Contention Resolution not successful. The UE may start the first timer after the second timer expires. When the first timer is running, the UE may monitor the PDCCH addressed to a Temporary C-RNTI (and possibly receive a Msg4). The UE may consider the RA procedure successfully completed after receiving the Msg4.

For example, the UE may transmit a Msg3 using UL grant received in Msg2 and/or MSGB (e.g., with fallbackRAR). The UE may start a second timer after the Msg3 transmission (e.g., in the end of the Msg3 transmission). The UE may start the first timer after (or in response to) the second timer expires. When the first timer is running, the UE may monitor the PDCCH addressed to a Temporary C-RNTI. When the first timer expires, the UE checks whether the second timer is running. If the second timer is not running, the UE may consider the Contention Resolution not successful and back off to retransmit a Msg1.

In view of and applying aspects of the disclosure provided above and herein, FIGS. 12-17 provide methods, actions, processes, and/or steps according to various exemplary embodiments of the present invention.

Figure 12:
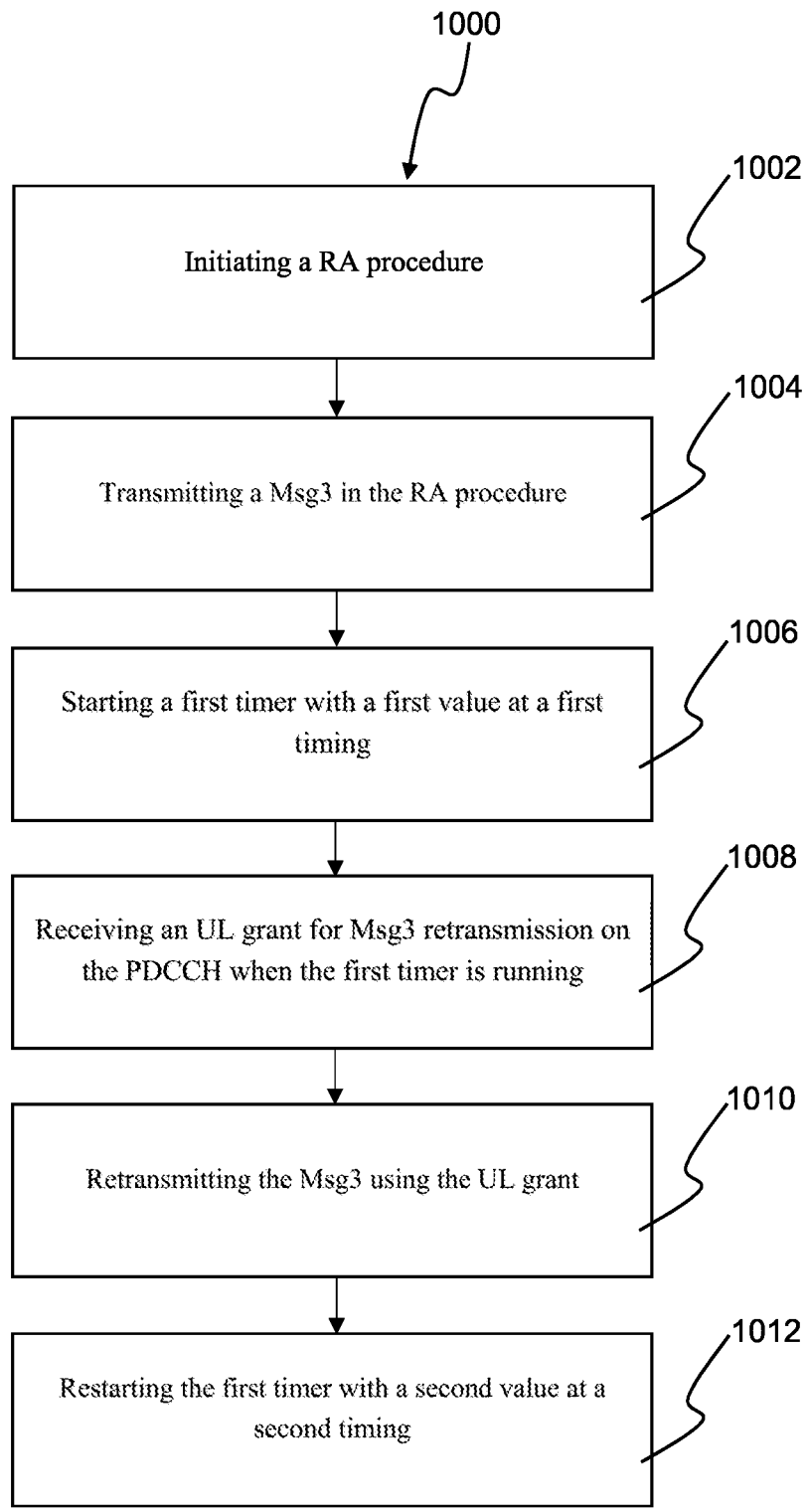
FIG. 12 is a flow diagram showing a method of handling Contention Resolution in a wireless communication system, including a first timer with a first value at a first time, and restarting the first timer with a second value at a second time, in accordance with embodiments of the present invention.

Referring to FIG. 12, with this and other concepts and methods of the present invention, a method 1000 of a UE comprises initiating a RA procedure at step 1002, transmitting a Msg3 in the RA procedure at step 1004, starting a first timer with a first value at a first timing at step 1006, receiving an UL grant for Msg3 retransmission on the PDCCH when the first timer is running at step 1008, retransmitting the Msg3 using the UL grant at step 1010, and restarting the first timer with a second value at a second timing at step 1012.

In various embodiments, the second value is the first value plus a timing offset.

In various embodiments, the first timing is the first symbol after the end of the Msg3 transmission plus a timing offset.

In various embodiments, the second timing is the first symbol after the end of the Msg3 retransmission.

Referring back to FIGS. 3 and 4, in one or more embodiments, the UE/device 300 includes program code 312 stored in memory 310. The CPU 308 could execute program code 312 to (i) initiate a RA procedure; (ii) transmit a Msg3 in the RA procedure; (iii) start a first timer with a first value at a first timing; (iv) receive an UL grant for Msg3 retransmission on the PDCCH when the first timer is running; (v) retransmit the Msg3 using the UL grant; and (vi) restart the first timer with a second value at a second timing. Moreover, the CPU 308 can execute the program code 312 to perform all of the described actions, steps, and methods described above, below, or otherwise herein.

Figure 13:
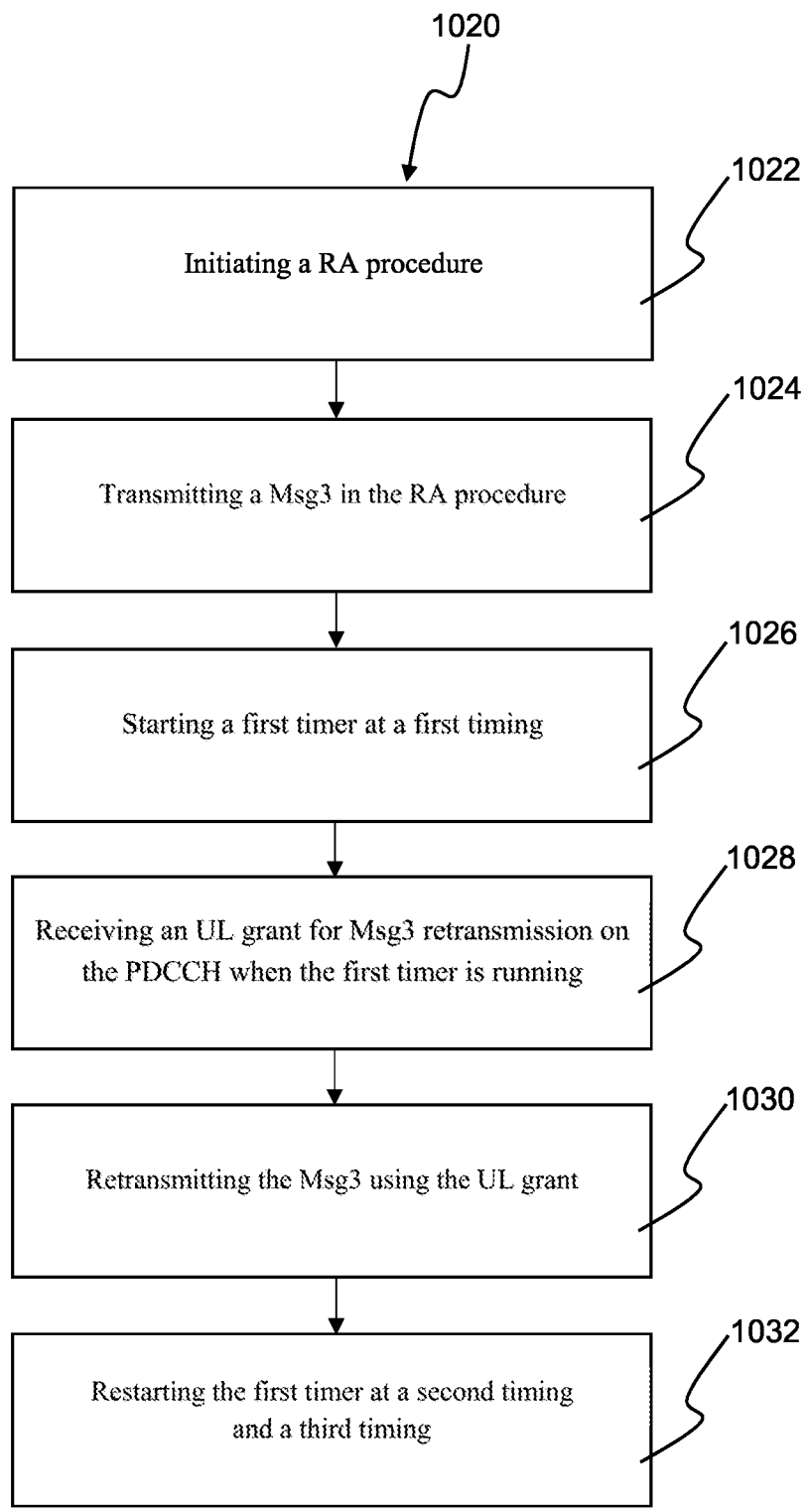
FIG. 13 is a flow diagram showing a method of handling Contention Resolution in a wireless communication system, including a first timer at a first timing, and restarting the first timer at a second timing and a third timing, in accordance with embodiments of the present invention.

Referring to FIG. 13, with this and other concepts and methods of the present invention, a method 1020 of a UE comprises initiating a RA procedure at step 1022, transmitting a Msg3 in the RA procedure at step 1024, starting a first timer at a first timing at step 1026, receiving an UL grant for Msg3 retransmission on the PDCCH when the first timer is running at step 1028, retransmitting the Msg3 using the UL grant at step 1030, and restarting the first timer at a second timing and a third timing at step 1032.

In various embodiments, the first timing is the first symbol after the end of the Msg3 transmission plus a timing offset.

In various embodiments, the second timing is the first symbol after the first timer expires.

In various embodiments, the second timing is the first symbol after the end of the Msg3 retransmission.

In various embodiments, the third timing is the first symbol after the end of the Msg3 retransmission plus a timing offset.

Referring back to FIGS. 3 and 4, in one or more embodiments, the UE/device 300 includes program code 312 stored in memory 310. The CPU 308 could execute program code 312 to (i) initiate a RA procedure; (ii) transmit a Msg3 in the RA procedure; (iii) start a first timer at a first timing; (iv) receive an UL grant for Msg3 retransmission on the PDCCH when the first timer is running; (v) retransmit the Msg3 using the UL grant; and (vi) restart the first timer with a second timing and a third timing. Moreover, the CPU 308 can execute the program code 312 to perform all of the described actions, steps, and methods described above, below, or otherwise herein.

Figure 14:
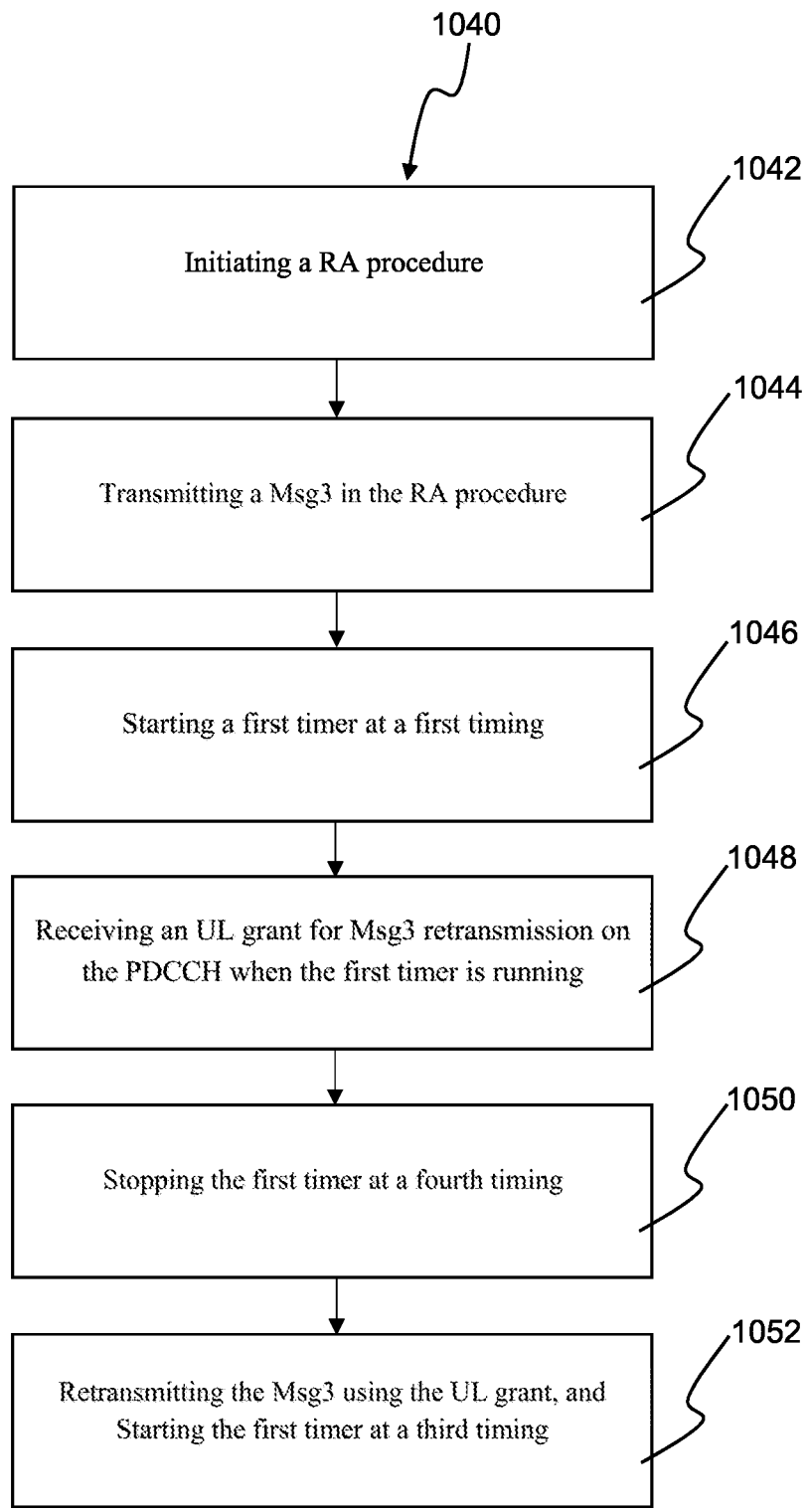
FIG. 14 is a flow diagram showing a method of handling Contention Resolution in a wireless communication system, including a first timer at a first timing, stopping the first timer at a fourth timing, and starting the first timer at a third timing, in accordance with embodiments of the present invention.

Referring to FIG. 14, with this and other concepts and methods of the present invention, a method 1040 of a UE comprises initiating a RA procedure at step 1042, transmitting a Msg3 in the RA procedure at step 1044, starting a first timer at a first timing at step 1046, receiving an UL grant for Msg3 retransmission on the PDCCH when the first timer is running at step 1048, stopping the first timer at a fourth timing at step 1050, and retransmitting the Msg3 using the UL grant and starting the first timer at a third timing at step 1052.

In various embodiments, the first timing is the first symbol after the end of the Msg3 transmission plus a timing offset.

In various embodiments, the fourth timing is the first symbol after the end of the UL grant receiving.

In various embodiments, the third timing is the first symbol after the end of the Msg3 retransmission plus a timing offset.

In various embodiments, the UE further monitors the PDCCH when the first timer is running;

In various embodiments, the first timer is used for Contention Resolution.

In various embodiments, the first timer is a contention resolution timer (e.g., ra-ContentionResolutionTimer).

In various embodiments, the RA procedure is a 2-step RA and/or a 4-step RA in a NTN.

In various embodiments, the timing offset is the time delay (e.g., RTT, RTD, TA) between the UE and the NW in a NTN.

In various embodiments, the timing offset is provided by the NW and/or calculated by the UE.

Referring back to FIGS. 3 and 4, in one or more embodiments, the UE/device 300 includes program code 312 stored in memory 310. The CPU 308 could execute program code 312 to (i) initiate a RA procedure; (ii) transmit a Msg3 in the RA procedure; (iii) start a first timer at a first timing; (iv) receive an UL grant for Msg3 retransmission on the PDCCH when the first timer is running; (v) stop the first timer at a fourth timing; (vi) retransmit the Msg3 using the UL grant; and (vii) start the first timer at a third timing. Moreover, the CPU 308 can execute the program code 312 to perform all of the described actions, steps, and methods described above, below, or otherwise herein.

Figure 15:
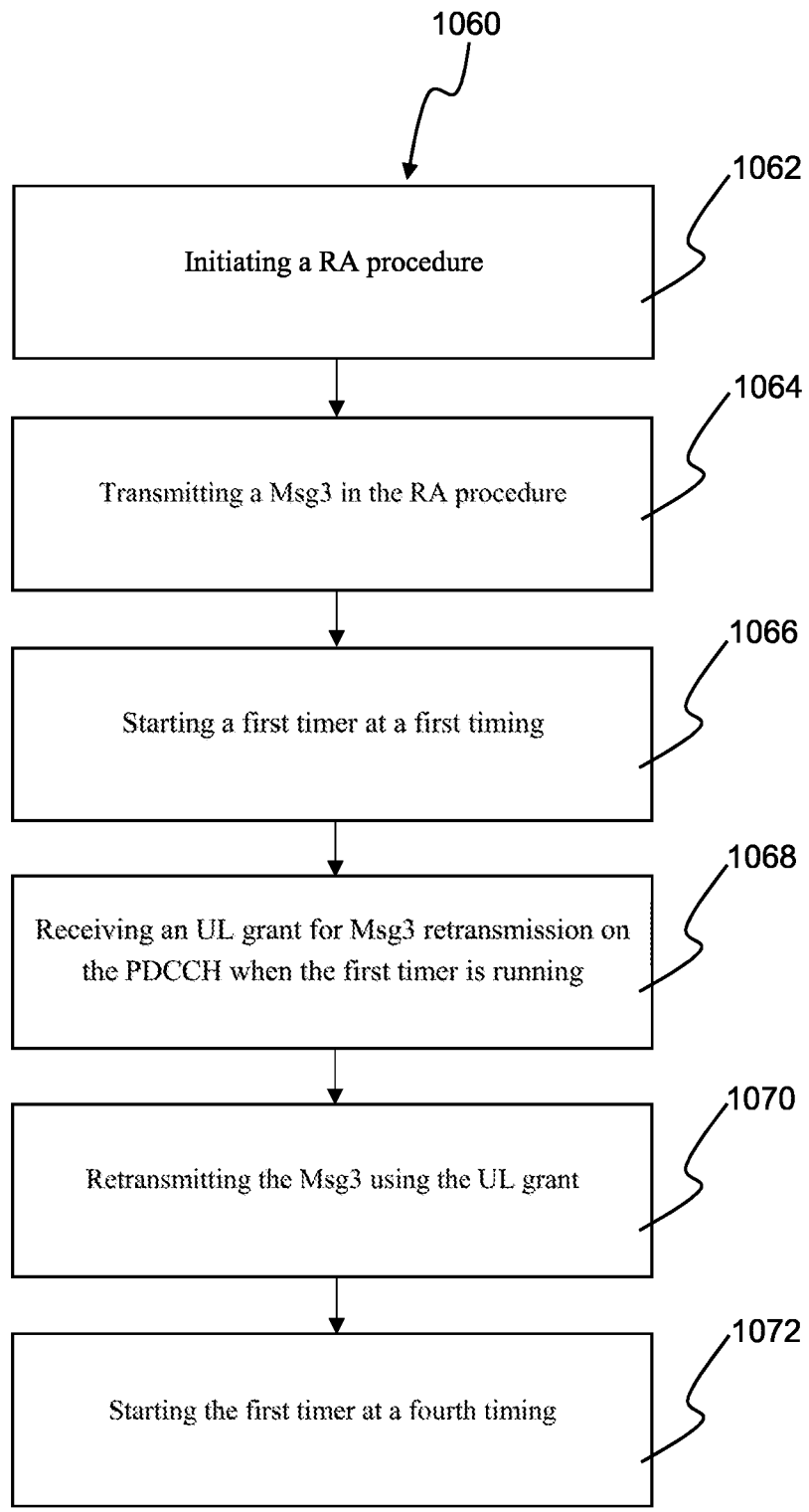
FIG. 15 is a flow diagram showing a method of handling Contention Resolution in a wireless communication system, including a first timer with a first value at a first time, and starting the first timer at a fourth timing, in accordance with embodiments of the present invention.

Referring to FIG. 15, with this and other concepts and methods of the present invention, a method 1060 of a UE comprises initiating a RA procedure at step 1062, transmitting a Msg3 in the RA procedure at step 1064, starting a first timer at a first timing at step 1066, receiving an UL grant for Msg3 retransmission on the PDCCH when the first timer is running at step 1068, retransmitting the Msg3 using the UL grant at step 1070, and starting the first timer at a fourth timing at step 1072.

In various embodiments, the first timing is the first symbol after the end of the Msg3 transmission plus a timing offset.

In various embodiments, the fourth timing is the first symbol after the end of the Msg3 retransmission plus a timing offset.

In various embodiments, the first timer expires before the fourth timing.

In various embodiments, the UE does not consider the Contention Resolution not successful when the first timer expires.

In various embodiments, the UE further monitors the PDCCH when the first timer is running.

In various embodiments, the first timer is used for Contention Resolution.

In various embodiments, the first timer is a contention resolution timer (e.g., ra-ContentionResolutionTimer).

In various embodiments, the RA procedure is a 2-step RA and/or 4-step RA in NTN.

In various embodiments, the timing offset is the time delay (e.g., RTT, RTD, TA) between the UE and the NW in NTN.

In various embodiments, the timing offset is provided by the NW and/or calculated by the UE.

Referring back to FIGS. 3 and 4, in one or more embodiments, the UE/device 300 includes program code 312 stored in memory 310. The CPU 308 could execute program code 312 to (i) initiate a RA procedure; (ii) transmit a Msg3 in the RA procedure; (iii) start a first timer at a first timing; (iv) receive an UL grant for Msg3 retransmission on the PDCCH when the first timer is running; (v) retransmit the Msg3 using the UL grant; and (vi) start the first timer at a fourth timing. Moreover, the CPU 308 can execute the program code 312 to perform all of the described actions, steps, and methods described above, below, or otherwise herein.

Figure 16:
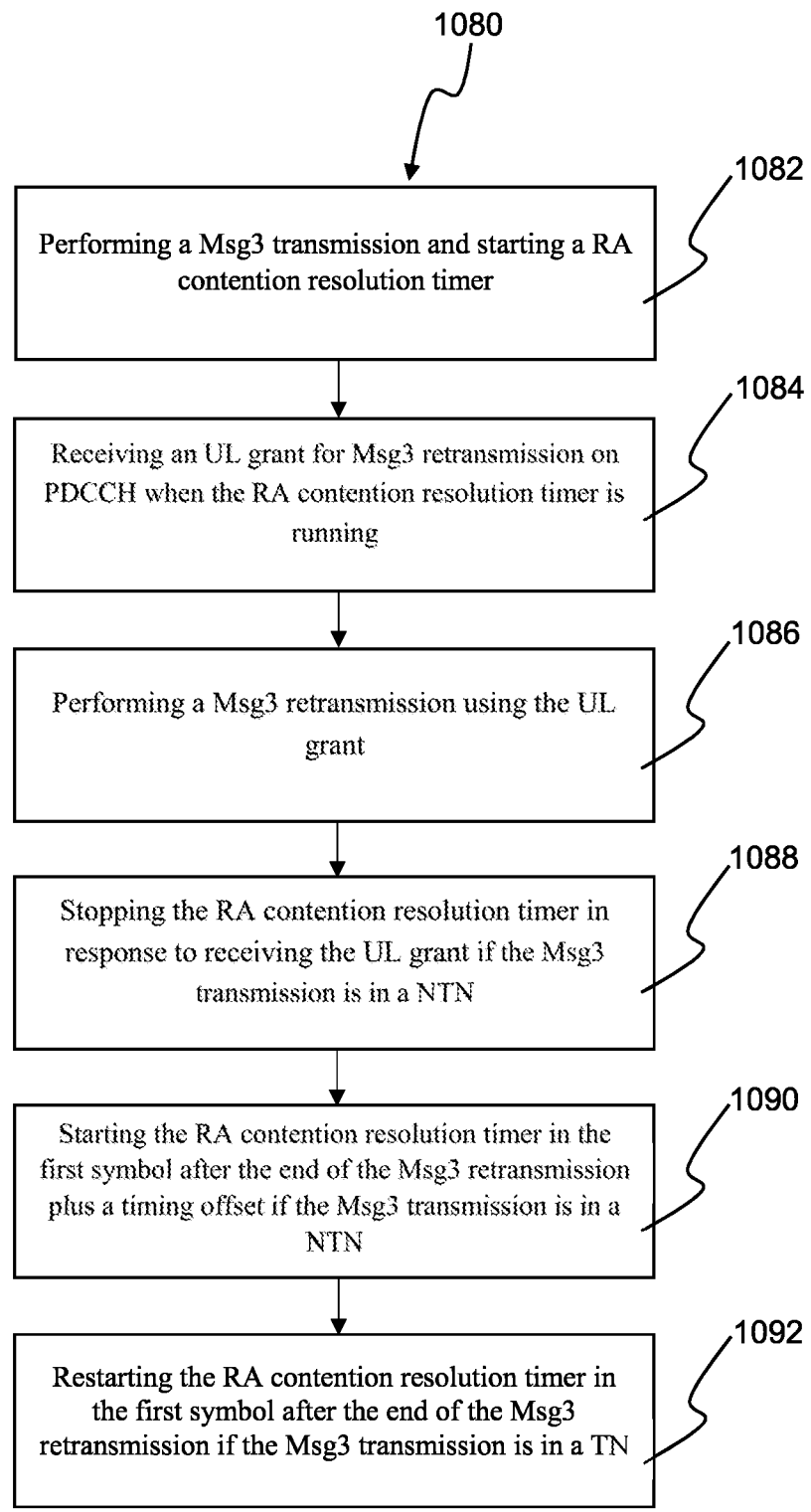
FIG. 16 is a flow diagram showing a method of handling Contention Resolution in a wireless communication system, including stopping a RA contention resolution timer and starting the RA timer in the first symbol after the end of a Msg3 transmission plus a timing offset if the Msg3 is in a NTN, and restarting the RA contention resolution timer in the first symbol after the end of the Msg3 retransmission if the Msg3 transmission is in a TN, in accordance with embodiments of the present invention.

Referring to FIG. 16, with this and other concepts and methods of the present invention, a method 1080 of a UE comprises performing a Msg3 transmission and starting a RA contention resolution timer at step 1082, receiving an UL grant for Msg3 retransmission on PDCCH when the RA contention resolution timer is running at step 1084, performing a Msg3 retransmission using the UL grant at step 1086, stopping the RA contention resolution timer in response to receiving the UL grant (at step 1088) and starting the RA contention resolution timer in the first symbol after the end of the Msg3 retransmission plus a timing offset if the Msg3 transmission is in a NTN (at step 1090), and restarting the RA contention resolution timer in the first symbol after the end of the Msg3 retransmission if the Msg3 transmission is in a TN, at step 1092.

In various embodiments, the RA contention resolution timer is started in the first symbol after the end of the Msg3 transmission plus the timing offset if the Msg3 transmission is in the NTN.

In various embodiments, the RA contention resolution timer is started in the first symbol after the end of the Msg3 transmission if the Msg3 transmission is in the TN.

In various embodiments, further including considering Contention Resolution not successful in response to expiry of the RA contention resolution timer.

In various embodiments, the timing offset is the time delay between the UE and the network in NTN.

In various embodiments, the time delay is a round trip time.

Referring back to FIGS. 3 and 4, in one or more embodiments, the UE/device 300 includes program code 312 stored in memory 310. The CPU 308 could execute program code 312 to (i) perform a Msg3 transmission and starting a RA contention resolution timer; (ii) receive an UL grant for Msg3 retransmission on PDCCH when the RA contention resolution timer is running; (iii) perform a Msg3 retransmission using the UL grant, (iv) stop the RA contention resolution timer in response to receiving the UL grant, (v) start the RA contention resolution timer in the first symbol after the end of the Msg3 retransmission plus a timing offset if the Msg3 transmission is in a NTN; and (vi) restart the RA contention resolution timer in the first symbol after the end of the Msg3 retransmission if the Msg3 transmission is in a TN. Moreover, the CPU 308 can execute the program code 312 to perform all of the described actions, steps, and methods described above, below, or otherwise herein.

Figure 17:
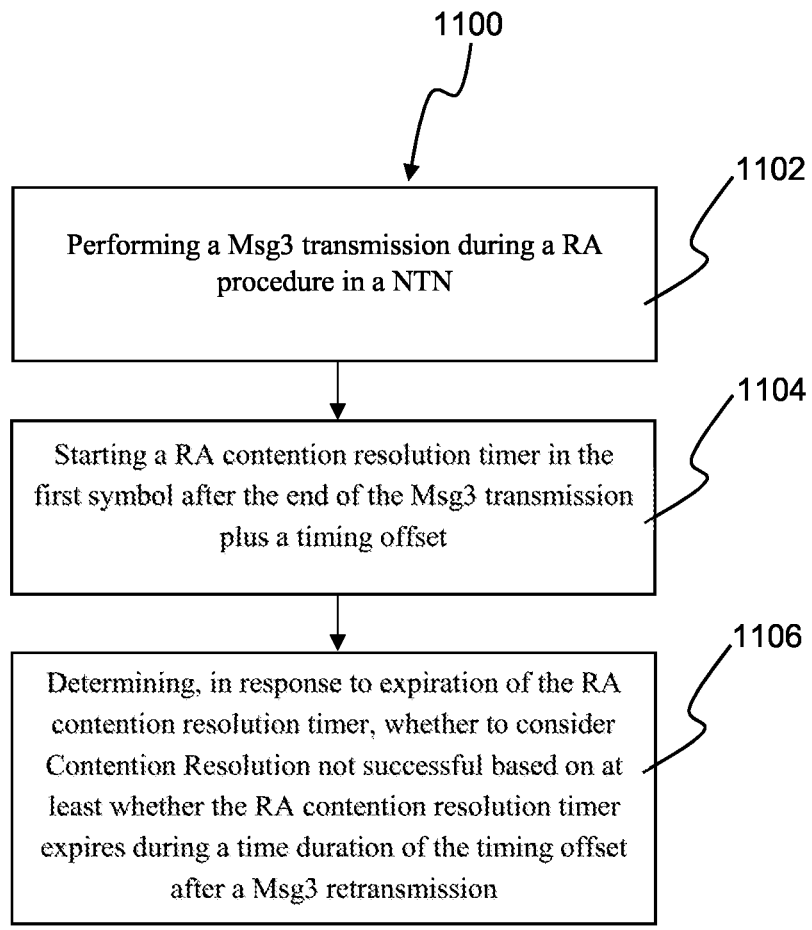
FIG. 17 is a flow diagram showing a method of handling Contention Resolution in a wireless communication system, including performing a Msg3 transmission during a RA procedure in a NTN, starting a RA contention resolution timer in the first symbol after the end of the Msg3 transmission plus a timing offset, and determining whether to consider Content Resolution not successful based on at least whether a condition is fulfilled or not, in accordance with embodiments of the present invention.

Referring to FIG. 17, with this and other concepts and methods of the present invention, a method 1100 of a UE comprises performing a Msg3 transmission during a RA procedure in a NTN at step 1102, starting a RA contention resolution timer in the first symbol after the end of the Msg3 transmission plus a timing offset at step 1104, and determining, in response to expiration of the RA contention resolution timer, whether to consider Contention Resolution not successful based on at least whether the RA contention resolution timer expires during a time duration of the timing offset after a Msg3 retransmission, at step 1106.

In various embodiments, the method further comprises considering the Contention Resolution not successful based on at least the RA contention resolution timer expiring not during a time duration of the timing offset after a Msg3 retransmission.

In various embodiments, the UE does not consider the Contention Resolution not successful based on at least the RA contention resolution timer expiring during a time duration of the timing offset after a Msg3 retransmission.

In various embodiments, the timing offset is the time delay between the UE and a network in NTN.

In various embodiments, the time delay is a round trip time.

In various embodiments, the method further comprises receiving an UL grant for Msg3 retransmission on PDCCH when the RA contention resolution timer is running, performing a Msg3 retransmission using the UL grant, and restarting or starting the RA contention resolution timer in the first symbol after the end of the Msg3 retransmission plus the timing offset.

Referring back to FIGS. 3 and 4, in one or more embodiments, the UE/device 300 includes program code 312 stored in memory 310. The CPU 308 could execute program code 312 to (i) perform a Msg3 transmission during a RA procedure in a NTN; (ii) start a RA contention resolution timer in the first symbol after the end of the Msg3 transmission plus a timing offset; and (iii) determine, in response to expiration of the RA contention resolution timer, whether to consider Contention Resolution not successful based on at least whether the RA contention resolution timer expires during a time duration of the timing offset after a Msg3 retransmission. Moreover, the CPU 308 can execute the program code 312 to perform all of the described actions, steps, and methods described above, below, or otherwise herein.

Figure 18:
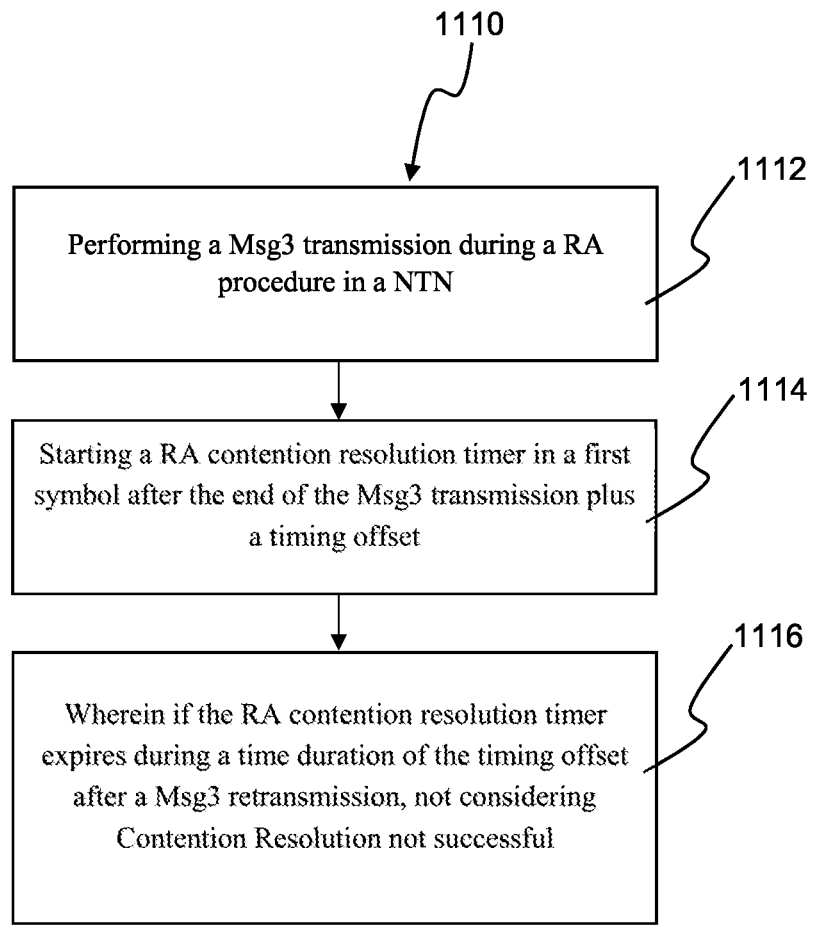
FIG. 18 is a flow diagram showing a method of handling Contention Resolution in a wireless communication system, including performing a Msg3 transmission during a RA procedure in a NTN, starting a RA contention resolution timer in the first symbol after the end of the Msg3 transmission plus a timing offset, and wherein if the RA contention resolution timer expires during a time duration of the timing offset after a Msg3 retransmission, not considering Contention Resolution not successful, in accordance with embodiments of the present invention.

Referring to FIG. 18, with this and other concepts and methods of the present invention, a method 1110 of a UE comprises performing a Msg3 transmission during a RA procedure in a NTN at step 1112, and starting a RA contention resolution timer in a first symbol after the end of the Msg3 transmission plus a timing offset at step 1114, wherein if the RA contention resolution timer expires during a time duration of the timing offset after a Msg3 retransmission, not considering Contention Resolution not successful (step 1116).

In various embodiments, the UE determines, in response to expiry of the RA contention resolution timer, not to consider the Contention Resolution not successful based on at least the RA contention resolution timer expiring during the time duration of the timing offset after a Msg3 retransmission.

In various embodiments, the method further comprises considering the Contention Resolution not successful, in response to expiry of the RA contention resolution timer, if an UL grant for retransmitting a Msg3 is not received when the RA contention resolution timer is running.

In various embodiments, the method further comprises considering the Contention Resolution not successful in response to expiry of the RA contention resolution timer based on at least not receiving PDCCH indicating a Msg3 retransmission when the RA contention resolution timer is running.

In various embodiments, the method further comprises considering the Contention Resolution not successful, in response to expiry of the RA contention resolution timer, if the UE performs the Msg3 transmission in a TN.

In various embodiments, the method further comprises receiving an UL grant for Msg3 retransmission on PDCCH when the RA contention resolution timer is running, performing a Msg3 retransmission using the UL grant, and starting or restarting the RA contention resolution timer in the first symbol after the end of the Msg3 retransmission plus the timing offset.

In various embodiments, the timing offset is a time delay between the UE and a network in NTN.

In various embodiments, the time delay is a round trip time or a round trip delay.

In various embodiments, the RA contention resolution timer is stopped when the UE receives a Msg4.

In various embodiments, the UE considers the RA procedure successfully completed when the UE receives the Msg4.

Referring back to FIGS. 3 and 4, in one or more embodiments, the UE/device 300 includes program code 312 stored in memory 310. The CPU 308 could execute program code 312 to (i) perform a Msg3 transmission during a RA procedure in a NTN, (ii) start a RA contention resolution timer in a first symbol after the end of the Msg3 transmission plus a timing offset, and (iii) wherein if the RA contention resolution timer expires during a time duration of the timing offset after a Msg3 retransmission, not considering Contention Resolution not successful. Moreover, the CPU 308 can execute the program code 312 to perform all of the described actions, steps, and methods described above, below, or otherwise herein.

According to various embodiments of the present invention, when the first timer is running, the UE may monitor the PDCCH. When the second timer is running, the UE may not monitor the PDCCH. When both the first and second timer are running, the UE may not monitor the PDCCH. The UE may not monitor the PDCCH during the timing offset. When the first timer is running, the UE is in DRX Active time, e.g., 3GPP TS 38.321 V16.3.0, "NR, MAC protocol specification". When the second timer is running, the UE is not in DRX Active time. When both the first and second timer are running, the UE is not in DRX Active time.

The UE may be in a cell of a NTN. The UE may be connected to a cell of a NTN. The UE may be connected to a LEO, GEO, MEO, HEO, and/or HAPS.

The UE may receive configurations related to NTN and/or RA. The configuration may include first timer(s), second timer, and/or timing offset. The value/length of the first timer (e.g., used in a NTN) may be the same as the contention resolution timer (e.g., ra-ContentionResolutionTimer) used in a TN. The value/length of the first timer (e.g., used in a NTN) may be different from the contention resolution timer (e.g., ra-ContentionResolutionTimer) used in a TN.

The UE may be referred to as the UE, a MAC entity of the UE, or a RRC entity of the UE.

The UE may be a NR device, a NR-light device, a reduced capability device, a mobile phone or device, a wearable device, a sensor, or a stationary device.

The network may be a network node, a base station, an access point, an eNB, a gNB, or a gateway.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
   performing a Msg3 transmission during a Random Access (RA) procedure in a Non-Terrestrial Network (NTN);
   starting a RA contention resolution timer in response to the Msg3 transmission; and
   in response to expiry of the RA contention resolution timer, considering Contention Resolution not successful if an Uplink (UL) grant for retransmitting the Msg3 is not received when the RA contention resolution timer is running.

2. The method of claim 1, wherein the UE determines, in response to expiry of the RA contention resolution timer, not to consider the Contention Resolution not successful based on at least the RA contention resolution timer expiring during a time duration of a timing offset after a Msg3 retransmission.

3. The method of claim 1, further including considering the Contention Resolution not successful, in response to expiry of the RA contention resolution timer, based on at least not receiving Physical Downlink Control Channel (PDCCH) indicating Msg3 retransmission when the RA contention resolution timer is running.

4. The method of claim 1, further including considering the Contention Resolution not successful, in response to expiry of the RA contention resolution timer, if the UE performs the Msg3 transmission in a Terrestrial Network (TN).

5. The method of claim 1, further comprising:
   if receiving an UL grant for a Msg3 retransmission on PDCCH when the RA contention resolution timer is running:
     performing the Msg3 retransmission using the UL grant; and
     starting or restarting the RA contention resolution timer in a first symbol after an end of an Msg3 retransmission plus a timing offset.

6. The method of claim 5, wherein the timing offset is a time delay between the UE and a network in NTN.

7. The method of claim 6, wherein the time delay is a round trip time or a round trip delay.

8. The method of claim 1, wherein the RA contention resolution timer is stopped when the UE receives a Msg4.

9. The method of claim 8, wherein the UE considers the RA procedure successfully completed when the UE receives the Msg4.

10. The method of claim 1, wherein the RA contention resolution timer is started in a first symbol after an end of the Msg3 transmission plus a timing offset.

11. A User Equipment (UE), comprising:
    a memory; and
    a processor operatively coupled with the memory, wherein the processor is configured to execute program code to:
      perform a Msg3 transmission during a Random Access (RA) procedure in a Non-Terrestrial Network (NTN);
      start a RA contention resolution timer in response to the Msg3 transmission; and
      in response to expiry of the RA contention resolution timer, consider Contention Resolution not successful if an Uplink (UL) grant for retransmitting the Msg3 is not received when the RA contention resolution timer is running.

12. The UE of claim 11, wherein the processor is further configured to execute program code to determine, in response to expiry of the RA contention resolution timer, not to consider the Contention Resolution not successful based on at least the RA contention resolution timer expiring during a time duration of a timing offset after a Msg3 retransmission.

13. The UE of claim 11, wherein the processor is further configured to execute program code to consider the Contention Resolution not successful, in response to expiry of the RA contention resolution timer, based on at least not receiving Physical Downlink Control Channel (PDCCH) indicating Msg3 retransmission when the RA contention resolution timer is running.

14. The UE of claim 11, wherein the processor is further configured to execute program code to consider the Contention Resolution not successful, in response to expiry of the RA contention resolution timer, if the UE performs the Msg3 transmission in a Terrestrial Network (TN).

15. The UE of claim 11, wherein the processor is further configured to execute program code to:
    if receive an UL grant for a Msg3 retransmission on PDCCH when the RA contention resolution timer is running:
      perform the Msg3 retransmission using the UL grant; and
      start or restart the RA contention resolution timer in a first symbol after an end of the Msg3 retransmission plus a timing offset.

16. The UE of claim 15, wherein the timing offset is a time delay between the UE and a network in NTN.

17. The UE of claim 16, wherein the time delay is a round trip time or a round trip delay.

18. The UE of claim 11, wherein the RA contention resolution timer is stopped when the UE receives a Msg4.

19. The UE of claim 18, wherein the UE considers the RA procedure successfully completed when the UE receives the Msg4.

20. The UE of claim 11, wherein the RA contention resolution timer is started in a first symbol after an end of the Msg3 transmission plus a timing offset.

\* \* \* \* \*